US010666533B2

(12) United States Patent
Wiener et al.

(10) Patent No.: US 10,666,533 B2
(45) Date of Patent: *May 26, 2020

(54) TAG LATENCY MONITORING AND CONTROL SYSTEM FOR ENHANCED WEB PAGE PERFORMANCE

(71) Applicant: Oracle International Corporation, Redwood Shores, CA (US)

(72) Inventors: David Abraham Wiener, Cupertino, CA (US); Dossel Obrian Reid, Jr., San Jose, CA (US); David Scott Gardner, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 15/886,107

(22) Filed: Feb. 1, 2018

(65) Prior Publication Data

US 2018/0159754 A1 Jun. 7, 2018

Related U.S. Application Data

(63) Continuation-in-part of application No. 14/415,936, filed as application No. PCT/US2013/050867 on Jul.
(Continued)

(51) Int. Cl.
*H04L 12/26* (2006.01)
*H04L 12/841* (2013.01)
(Continued)

(52) U.S. Cl.
CPC .......... *H04L 43/0852* (2013.01); *G06F 11/30* (2013.01); *G06F 15/173* (2013.01);
(Continued)

(58) Field of Classification Search
CPC .. G06F 11/30; H04L 43/0852; H04L 43/0888; H04L 47/28; H04L 47/31; H04L 67/02
See application file for complete search history.

(56) References Cited

U.S. PATENT DOCUMENTS

| 5,787,254 A | 7/1998 | Maddalozzo, Jr. et al. |
| 6,192,382 B1 | 2/2001 | Later et al. |

(Continued)

FOREIGN PATENT DOCUMENTS

| CN | 1745375 | 3/2006 |
| CN | 101004757 A | 7/2007 |

(Continued)

OTHER PUBLICATIONS

Chinese Application No. 201380043389.1, Office Action dated Dec. 5, 2016, 14 pages (6 pages for the original document and 8 pages for the English translation).
(Continued)

*Primary Examiner* — Mohamed A. Wasel
(74) *Attorney, Agent, or Firm* — Kilpatrick Townsend & Stockton, LLP

(57) ABSTRACT

Embodiments are directed towards employing a plurality of tag states to control tag suspension based on an asynchronous process that proactively monitors tag performance, response times, privacy safeguards, and latency. Tags may be in one of multiple states. Tags in a NORMAL state or a FLAGGED state may be enabled for deployment, and tags in a SUSPENSION A state or a SUSPENSION B state may be blocked from deployment. A tag's state may change based on monitoring the tag's latency to determine if latent events occur. Tag latency may be asynchronously monitored independent of web page requests or requests to execute an application. For example, if latent events occur, then the tag's state may change from NORMAL to FLAGGED, and
(Continued)

if non-latent events occur, then the tag's state may change from FLAGGED to NORMAL.

20 Claims, 12 Drawing Sheets

Related U.S. Application Data 17, 2013, now Pat. No. 9,906,423, which is a continuation of application No. 13/554,500, filed on Jul. 20, 2012, now Pat. No. 8,706,871.

(51) Int. Cl.

| | |
|---|---|
| *H04L 29/08* | (2006.01) |
| *G06F 15/173* | (2006.01) |
| *G06F 11/30* | (2006.01) |
| *G06F 16/957* | (2019.01) |
| *G06F 40/14* | (2020.01) |
| *H04L 12/823* | (2013.01) |
| *H04L 12/833* | (2013.01) |

(52) U.S. Cl.
CPC ............ *G06F 16/957* (2019.01); *G06F 40/14* (2020.01); *H04L 43/0888* (2013.01); *H04L 47/28* (2013.01); *H04L 67/02* (2013.01); *H04L 67/18* (2013.01); *H04L 67/322* (2013.01); *H04L 67/34* (2013.01); *H04L 47/31* (2013.01); *H04L 47/32* (2013.01); *H04L 67/20* (2013.01)

(56) References Cited

U.S. PATENT DOCUMENTS

| | | | |
|---|---|---|---|
| 6,992,983 B1 | 1/2006 | Chatterjee | |
| 7,440,953 B2 | 10/2008 | Sidman | |
| 7,765,295 B2* | 7/2010 | Anastas | G06F 16/986 709/224 |
| 7,996,814 B1* | 8/2011 | Qureshi | G06F 11/079 717/120 |
| 8,032,626 B1 | 10/2011 | Russell et al. | |
| 8,356,247 B2 | 1/2013 | Krassner | |
| 8,706,871 B2 | 4/2014 | Wiener et al. | |
| 8,856,027 B2 | 10/2014 | Khunteta | |
| 8,930,533 B2 | 1/2015 | Wiener et al. | |
| 9,165,308 B2* | 10/2015 | Cook | G06Q 30/02 |
| 9,231,858 B1 | 1/2016 | Greifeneder | |
| 9,723,057 B2 | 8/2017 | Wiener et al. | |
| 9,906,423 B2 | 2/2018 | Wiener et al. | |
| 2004/0107267 A1 | 6/2004 | Donker et al. | |
| 2004/0215768 A1 | 10/2004 | Oulu et al. | |
| 2005/0197164 A1 | 9/2005 | Chan | |
| 2007/0192701 A1 | 8/2007 | Joines et al. | |
| 2007/0271375 A1 | 11/2007 | Hwang | |
| 2007/0276790 A1 | 11/2007 | Walsh et al. | |
| 2007/0283036 A1 | 12/2007 | Dey et al. | |
| 2008/0155340 A1 | 6/2008 | Tsun | |
| 2008/0275980 A1 | 11/2008 | Hansen | |
| 2009/0106099 A1 | 4/2009 | Chow | |
| 2009/0164884 A1* | 6/2009 | Watson | G06F 16/972 715/234 |
| 2010/0088411 A1 | 4/2010 | Litofsky et al. | |
| 2010/0095155 A1 | 4/2010 | Tsun | |
| 2011/0083031 A1 | 4/2011 | Khunteta | |
| 2011/0197124 A1 | 8/2011 | Garaventa | |
| 2011/0302235 A1 | 12/2011 | Monk et al. | |
| 2011/0321016 A1* | 12/2011 | Haviv | G06F 11/3604 717/128 |
| 2012/0030338 A1 | 2/2012 | Zhang et al. | |
| 2012/0143693 A1 | 6/2012 | Chung et al. | |
| 2012/0144288 A1 | 6/2012 | Caruso et al. | |
| 2014/0025807 A1 | 1/2014 | Wiener et al. | |
| 2014/0189113 A1 | 7/2014 | Wiener et al. | |

| | | |
|---|---|---|
| 2015/0026239 A1 | 1/2015 | Hofmann et al. |
| 2015/0229553 A1 | 8/2015 | Wiener |
| 2016/0094615 A1 | 3/2016 | Wiener et al. |
| 2017/0356432 A1 | 12/2017 | Wiener et al. |

FOREIGN PATENT DOCUMENTS

| | | |
|---|---|---|
| CN | 101194247 | 6/2008 |
| CN | 101359394 | 2/2009 |
| CN | 102316536 | 1/2012 |
| CN | 102347864 | 2/2012 |
| CN | 104584000 A | 4/2015 |
| EP | 2875444 A1 | 5/2015 |
| EP | 2875444 A4 | 3/2016 |
| EP | 2875444 | 9/2016 |
| JP | 2003157173 A | 5/2003 |
| JP | 2004206634 A | 7/2004 |
| JP | 2006195709 A | 7/2006 |
| JP | 2015530639 A | 10/2015 |
| JP | 6262229 | 12/2017 |
| RU | 2015101336 A | 9/2016 |
| WO | 2014/015025 A1 | 1/2014 |

OTHER PUBLICATIONS

Chinese Application No. 201380043389.1, Office Action dated Aug. 1, 2017.

Japanese Patent Application No. 2015-523220 filed Jul. 17, 2013, received a Notice of Decision to Grant, dated Nov. 14, 2017, 2 pages.

Japanese Application No. 2015-523220, Office Action dated Apr. 4, 2017, 3 pages.

International Search Report dated Nov. 26, 2013 for corresponding PCT Patent Application No. PCT/US2013/050867, all pages.

International Preliminary Report on Patentability dated Jan. 20, 2015 for corresponding PCT Patent Application No. PCT/US2013/050867, 6 pages.

Extended European Search Report dated Feb. 29, 2016 for related EP Patent Application No. 13819625.8, 8 pages.

Russia Application No. 2015101336 received a Final Office Actions,(non-US) dated Dec. 11, 2017.

European Application No. 13819625.8, Office Action dated Mar. 20, 2017, 7 pages.

U.S. Appl. No. 13/554,500, Notice of Allowance dated Jan. 17, 2014, 9 pages.

U.S. Appl. No. 14/694,787, Non-Final Office Action dated Dec. 9, 2016, 11 pages.

U.S. Appl. No. 14/694,787, Notice of Allowance dated May 2, 2017, 5 pages.

U.S. Appl. No. 14/694,787, Notice of Allowability dated Jun. 9, 2017, 2 pages.

U.S. Appl. No. 14/415,936, Non-Final Office Action dated Oct. 27, 2016, 8 pages.

U.S. Appl. No. 14/415,936, Notice of Allowance dated May 8, 2017, 9 pages.

U.S. Appl. No. 14/415,936, Notice of Allowance dated Oct. 10, 2017. 8 pages.

"5 FREE Ways to Test Your Website Latency from Around the Globe", Activo-Magneto Development and POS Integration Activo; pp. 1-3; Oct. 7, 2010.

Paul Cook, "TagMan Latency test", public report, Apr. 2009; pp. 1-11.

Chinese Application No. 201380043389.1, Office Action dated Jun. 20, 2018, 17 pages (7 pages for the original document and 10 pages for the English translation).

McWherter et al., Testing asp.net Web Applications, Tsinghua University Press, Mar. 31, 2011, 3 pages.

Chinese Application No. 201380043389.1, Office Action dated Mar. 5, 2019, 11 pages. (4 pages of Original Document and 7 pages of English Translation).

European Application No. 13819625.8, Notice of Decision to Grant dated Aug. 23, 2018, 2 pages.

(56) References Cited

OTHER PUBLICATIONS

Chinese Application No. 201380043389.1, Notice of Decision to Grant dated Dec. 5, 2019, 5 pages.

* cited by examiner

TAG LATENCY MONITORING AND CONTROL SYSTEM FOR ENHANCED WEB PAGE PERFORMANCE

CROSS-REFERENCE TO RELATED APPLICATIONS

This application is a continuation-in-part application of U.S. Ser. No. 14/415,936, filed on Jan. 20, 2015, which is the national stage of International Patent Application No. PCT/US2013/050867, having an international filing date of Jul. 17, 2013, which claims priority to and is a continuation of U.S. patent application Ser. No. 13/554,500, filed on Jul. 20, 2012, now U.S. Pat. No. 8,706,871, entitled "TAG LATENCY MONITORING AND CONTROL SYSTEM FOR ENHANCED WEB PAGE PERFORMANCE", the entire disclosure of each of which are incorporated herein by reference for all purposes.

TECHNICAL FIELD

The present invention relates generally to tag management, and more particularly, but not exclusively to employing a plurality of tag states to control tag suspension based on an asynchronous process designed to proactively monitor tag latency.

BACKGROUND

Today, many websites include third party services that are separate from the website itself. For example, a website may include third party advertisements, help chat sessions, monitoring services, or the like. Typically, a third party may sell its services to a website such that when a user visits a specific web page, the web page loads with the third party service. Additionally, mobile applications and applications running on devices that deliver IPTV (Internet Protocol Television) are increasingly being embedded with a third party service for added functionality. Sometimes loading the third party service from within the website or application may include executing code for the third party service from a remote location. However, if the third party service is slow or unresponsive, then loading the web page or running the application may be slowed. In some cases, the web page or application may be prevented from completely loading or running at all. Thus, it is with respect to these considerations and others that the invention has been made.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Certain embodiments include a computer-implemented method, including: monitoring one or more characteristics of code, where the code is embeddable in an application, where the monitoring is asynchronous to requests to execute the application, and where the one or more characteristics of the code characterize a performance of the code while embedded in the application during execution. The computer-implemented method also includes determining a state for the code using the one or more characteristics. The computer-implemented method also includes determining a deployability of the code using the state of the code in response to a request to execute the application. Other embodiments of the embodiments include corresponding computer systems, apparatus, and computer programs recorded on one or more computer storage devices, each configured to perform the actions of the methods.

Implementations may include one or more of the following features. The computer-implemented method where the code corresponds to a plurality of states that includes at least a normal state, a flagged state, and at least one suspension state. The computer-implemented method where the plurality of states includes a state representing a geographic region in which the code is deployed. The computer-implemented method where monitoring the one or more characteristics of the code further includes: identifying that the one or more characteristics of the code to be monitored includes a privacy characteristic. The computer-implemented method may also include executing the code embedded within the application while the application is executing; determining whether executing the code causes a location service to be accessed; and in response to a determination that the location service is accessed, determining that the code is in a flagged state or a suspended state. In some implementations, when the system monitoring the code determines that the code has accessed the location service of a mobile device, for example, the system can generate a notification or generate an indication that the location service has been accessed. This notification or indication can be evaluated by the embedding application, and the embedding application can then determine which privacy concerns are to be blocked (e.g., a privacy concern may be that the location service of mobile devices should not be accessed by the embeddable code, and thus, the embedding application can determine that the code is to be blocked because the code accesses the location services of mobile devices). In some implementations, in lieu of or in addition to blocking a tag from being deployed into, for example, a web page or native application, one or more notifications and/or alerts (e.g., SMS alert, email alert, push notification, or an API integration) may be transmitted to the deployment system notifying the deployment system that the embeddable code violated a condition (e.g., lagged for a time that exceeds a threshold, accessed the location services of a mobile device, or violated one or more privacy standards). Further, whether the embeddable code is block from being embedded into an application, or whether the embeddable code triggers a notification if a condition is violated, in either case, the action(s) performed by the deployment system may all be differentiated by partner, partner site, country/geo-region, or even device-type (e.g., mobile browsers versus desktop browsers). Further, the deployment system of the application can then determine whether or not to embed the code into the application. The computer-implemented method where monitoring the one or more characteristics of the code further includes: monitoring the one or more characteristics of the code deployed in a first geographic region; determining, based on monitoring the one or more characteristics of the code deployed in the first geographic region, a first state for the code deployed in the first geographic region; monitoring the one or more characteristics of the code deployed in a second geographic region, where the first geographic region is different from the second geographic region; and determining, based on monitoring the one or more characteristics of the code deployed in the second geographic region, a second state for the code deployed in the second geographic region. The computer-implemented method where determining a state for the code using the one or more characteristics further includes: executing the code embedded within the application while the application is executing; determining whether or not executing the code embedded within the application causes one or more defined actions to be performed; and determining the state of the code based on whether or not the one or more defined actions are performed. The computer-implemented method where the one or more characteristics of the code include a latency characteristic, and where monitoring the latency characteristics includes determining a latency of executing the code embedded within the application. Implementations of the described techniques may include hardware, a method or process, or computer software on a computer-accessible medium.

Certain embodiments include a system, including: one or more data processors; and a non-transitory computer-readable storage medium containing instructions which, when executed on the one or more data processors, cause the one or more data processors to perform operations including: monitoring one or more characteristics of code, where the code is embeddable in an application, where the monitoring is asynchronous to requests to execute the application, and where the one or more characteristics of the code characterize a performance of the code while embedded in the application during execution. The operations also include determining a state for the code using the one or more characteristics. The operations also include determining a deployability of the code using the state of the code in response to a request to execute the application. Other embodiments of this aspect include corresponding computer systems, apparatus, and computer programs recorded on one or more computer storage devices, each configured to perform the actions of the methods.

Implementations may include one or more of the following features. The operations where the code corresponds to a plurality of states that includes at least a normal state, a flagged state, and at least one suspension state. The operations where the plurality of states includes a state representing a geographic region in which the code is deployed. The operations where monitoring the one or more characteristics of the code further includes: identifying that the one or more characteristics of the code to be monitored includes a privacy characteristic. The operations may also include executing the code embedded within the application while the application is executing; determining whether executing the code causes a location service to be accessed; and in response to a determination that the location service is accessed, determining that the code is in a flagged state or a suspended state. The operations where monitoring the one or more characteristics of the code further includes: monitoring the one or more characteristics of the code deployed in a first geographic region; determining, based on monitoring the one or more characteristics of the code deployed in the first geographic region, a first state for the code deployed in the first geographic region; monitoring the one or more characteristics of the code deployed in a second geographic region, where the first geographic region is different from the second geographic region; and determining, based on monitoring the one or more characteristics of the code deployed in the second geographic region, a second state for the code deployed in the second geographic region. The operations where determining a state for the code using the one or more characteristics further includes: executing the code embedded within the application while the application is executing; determining whether or not executing the code embedded within the application causes one or more defined actions to be performed; and determining the state of the code based on whether or not the one or more defined actions are performed. The operations where the one or more characteristics of the code include a latency characteristic, and where monitoring the latency characteristics includes determining a latency of executing the code embedded within the application. Implementations of the described techniques may include hardware, a method or process, or computer software on a computer-accessible medium.

Certain embodiments include a computer-program product tangibly embodied in a non-transitory machine-readable storage medium, including instructions configured to cause a data processing apparatus to perform operations including: monitoring one or more characteristics of code, where the code is embeddable in an application, where the monitoring is asynchronous to requests to execute the application, and where the one or more characteristics of the code characterize a performance of the code while embedded in the application during execution. The operations also include determining a state for the code using the one or more characteristics. The operations also include determining a deployability of the code using the state of the code in response to a request to execute the application. Other embodiments of this aspect include corresponding computer systems, apparatus, and computer programs recorded on one or more computer storage devices, each configured to perform the actions of the methods.

Implementations may include one or more of the following features. The operations where the code corresponds to a plurality of states that includes at least a normal state, a flagged state, and at least one suspension state. The operations where the plurality of states includes a state representing a geographic region in which the code is deployed. The operations where monitoring the one or more characteristics of the code further includes: identifying that the one or more characteristics of the code to be monitored includes a privacy characteristic. The operations may also include executing the code embedded within the application while the application is executing; determining whether executing the code causes a location service to be accessed; and in response to a determination that the location service is accessed, determining that the code is in a flagged state or a suspended state. The operations where monitoring the one or more characteristics of the code further includes: monitoring the one or more characteristics of the code deployed in a first geographic region; determining, based on monitoring the one or more characteristics of the code deployed in the first geographic region, a first state for the code deployed in the first geographic region; monitoring the one or more characteristics of the code deployed in a second geographic region, where the first geographic region is different from the second geographic region; and determining, based on monitoring the one or more characteristics of the code deployed in the second geographic region, a second state for the code deployed in the second geographic region. The operations where determining a state for the code using the one or more characteristics further includes: executing the code embedded within the application while the application is executing; determining whether or not executing the code embedded within the application causes one or more defined actions to be performed; and determining the state of the code based on whether or not the one or more defined actions are performed. Implementations of the described techniques may include hardware, a method or process, or computer software on a computer-accessible medium.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
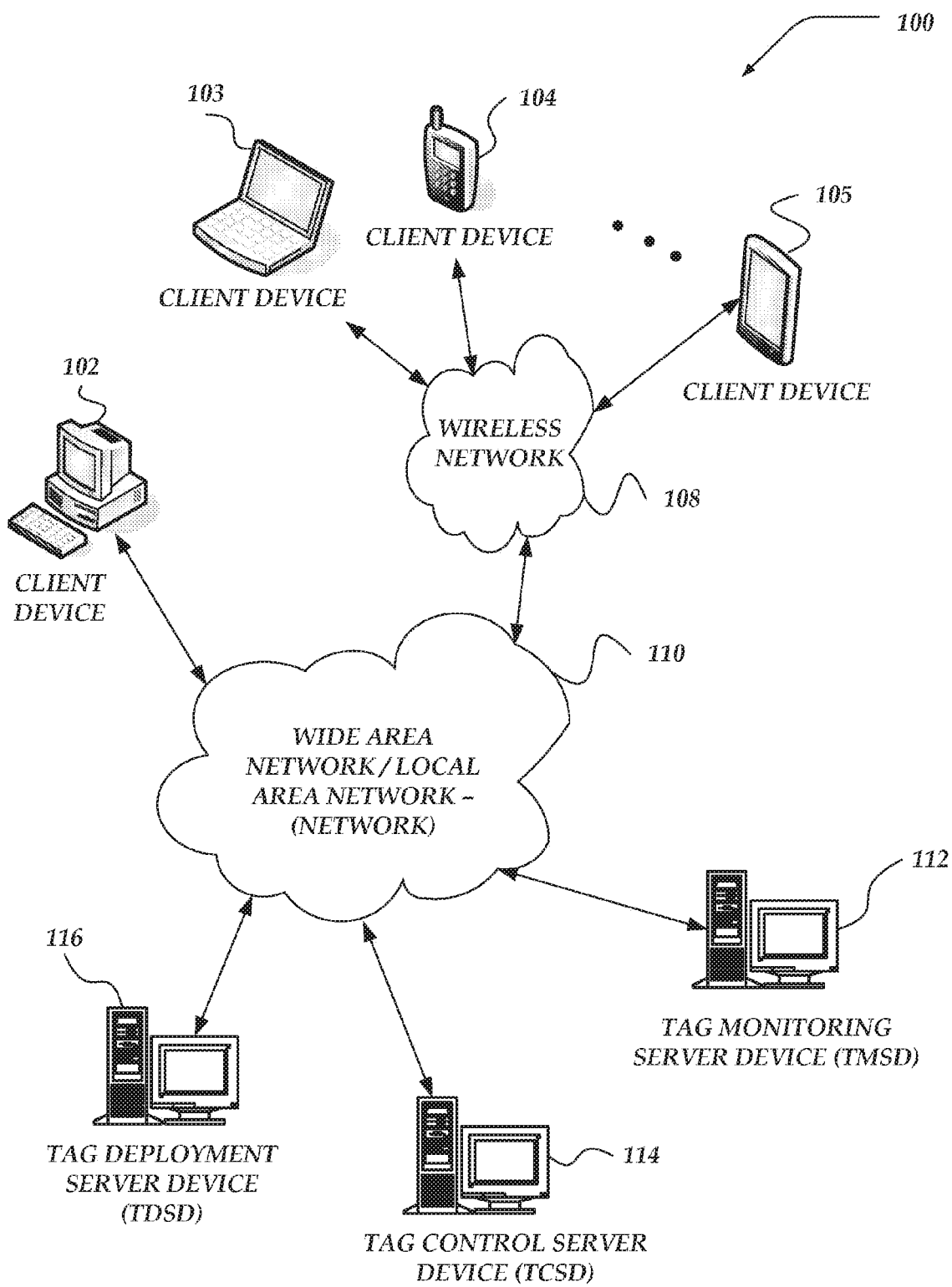
FIG. 1 is a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "tag" generally refers to code (e.g., JavaScript, image pixels, and so on) that may be injected into a web page using a third party solution at any point during the presentation of the web page. In some embodiments, a third party solution may reference a code provider that is separate from the host of the web page. In at least one embodiment, loading a tag into a web page may also be referred to as deploying the tag. In some embodiments, the presentations of a web page may be provided when a visitor visits a website or performs an on page action. In some embodiments, the tag may refer to code that is embeddable in an application executing on a device. Non-limiting examples of the application include a mobile application that is natively executing on a mobile device, a third-party content provider's application that is natively executing on a set-top box device that facilitates video streaming, and other suitable applications. An application may include code that, when executed on a device (e.g., a mobile device or set-top box device), is configured to display content and/or perform one or more functions. In some embodiments, an application may include embedded code from a third party service, such as a partner of a content provider. Further, the embedded code may perform one or more functions, including collecting data associated with operating the mobile device or the set-top box device (e.g., collecting data representing which shows are selected for streaming or how the mobile application is navigated). In some embodiments, the tag (e.g., the embedded code) may use the collected data to optimize and/or customize presentation of the application (e.g., a frame may be displayed to show the recently watched shows). Non-limiting examples of the embedded code may include JavaScript, Swift code, and other suitable embeddable coding languages.

As used herein, the term "tag latency" generally refers to a time from when a tag is requested to when a server response is received based on the tag request. In at least one embodiment, the tag latency may be based on a time from when a tag is requested to when the complete tag is deployed. In some embodiments, the tag latency may be based on a cumulative response time of each component of the tag, including any additional code or resources required by the tag component. In other embodiments, the tag latency may be based on a longest response time of a component of a plurality of components of the tag. In another embodiment, the tag latency may be based on an error message received in response to the tag request, such as, for example, a server response with an error code of 400-500. In some embodiments, the tag latency may be a time from when a tag is requested to when a server response error message is received.

As used herein, the term "latent event" refers to a result of monitoring the tag latency, where the tag latency is greater than a maximum time latency threshold. On the contrary, as used herein, the term "non-latent event" refers to a result of monitoring the tag latency, where the tag latency is less than a maximum time latency threshold. In at least one embodiment, the maximum time latency threshold may be determined and/or modified by a user (such as a host of the website for deploying a tag). In some embodiments, the maximum time latency threshold may be based on a desired web page load time, an average tag load time, or the like.

As used herein, the term "latency profile" refers to a profile associated with a tag. In some embodiments, the latency profile may include data representing one or more attributes of the latency of a tag. In some embodiments, the one or more attributes of the tag latency may include a geographical region associated with the detected latency. For example, a particular tag may be deployed in various geographical regions around the world. The latency profile of the tag may include a detected latency for the tag in each of the various geographical regions. For example, for a particular tag, the latency profile of the tag may include data representing the latency detected when the tag is deployed in the United States, the latency detected when the tag is deployed in Europe, and the latency detected when the tag is deployed in South America. In some embodiments, the latency profile may also include data representing the maximum time latency threshold for each geographic region included in the latency profile. For example, the latency profile associated with a tag may indicate the maximum time latency threshold for each of the United States, Europe, and South America. The selection of which maximum time latency threshold to select for a given tag may be dependent on the geographical region associated with the website request received from a client device operated by a website visitor. As a non-limiting example, the tag latency for a tag deployed in each of the United States and Europe may satisfy the maximum time latency threshold, however, the tag may not satisfy the maximum time latency threshold when the tag is deployed in South America. Advantageously, a tag's performance may be optimized for individual geographical regions around the world.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to employing a plurality of tag states to control tag suspension based on an asynchronous process designed to proactively monitor tag performance and measure response times. In some embodiments, tag latency may be monitored and/or measured to determine a tag's performance and/or response time. In some embodiments, the tag latency may be monitored and/or measured for each geographical region (e.g., country) in which the tag is deployed. The tag latency for a geographical region may represent the tag's performance and/or response time in that particular geographical region. In at least one embodiment, a user may register with a service to select tags for deployment on a web page. In some embodiments, a user may refer to a website, website host, website administrator, website consultant, or the like, or an agent thereof. Tags may be in one of a plurality of states, such as, for example, a NORMAL state, a FLAGGED state, a SUSPENSION A state, or a SUSPENSION B state. In at least one embodiment, tags in the NORMAL state or the FLAGGED state may be enabled to be deployed (i.e., available for deployment), and tags in the SUSPENSION_A state or the SUSPENSION_B state may be blocked from being deployed (i.e., suspended from deployment). In some embodiments, the plurality of states may include the geographical region(s) in which the tag is deployed. For example, tags in the EUROPE state may be enabled to be deployed within the geographical region of Europe.

Tag latency may be asynchronously monitored independent of web page requests. In some embodiments, a frequency to monitor the tags may be based on a tag's state. A tag's state may change based on the asynchronous monitoring of the tag's latency. Briefly, in some embodiments, if a latent event occurs (i.e., the tag latency exceeds a maximum time latency threshold), then the tag's state may change from NORMAL to FLAGGED, from FLAGGED to SUSPENSION A, or from SUSPENSION B to SUSPENSION A. In other embodiments, if a non-latent event occurs (i.e., the tag latency does not exceed the maximum time latency threshold), then the tag's state may change from SUSPENSION B to FLAGGED or from FLAGGED to NORMAL. In at least one embodiment, consecutive latent events or consecutive non-latent events may be utilized to change a tag's state. By employing a plurality of different states and changing a tag's states based on latent/non-latent events (and/or consecutive latent/non-latent events), a tag may not be prematurely blocked from deployment due to an abrupt increase in tag latency or prematurely enabled for deployment after being blocked due to an abrupt decrease in tag latency.

Illustrative Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client devices 102-105, Tag Monitoring Server Device (TMSD) 112, Tag Control Server Device (TCSD) 114, and Tag Deployment Server Device (TDSD) 116.

At least one embodiment of client devices 102-105 is described in more detail below in conjunction with FIG. 2. In one embodiment, at least some of client devices 102-105 may operate over a wired and/or wireless network, such as networks 110 and/or 108. Generally, client devices 102-105 may include virtually any computing device capable of communicating over a network to send and receive information, perform various online activities, offline actions, or the like. In one embodiment, one or more of client devices 102-105 may be configured to operate within a business or other entity to perform a variety of services for the business or other entity. For example, client devices 102-105 may be configured to operate as a web server, an accounting server, a production server, an inventory server, or the like. However, client devices 102-105 are not constrained to these services and may also be employed, for example, as an end-user computing node, in other embodiments. It should be recognized that more or less client devices may be included within a system such as described herein, and embodiments are therefore not constrained by the number or type of client devices employed.

Devices that may operate as client device 102 may include devices that typically connect using a wired or wireless communications medium such as personal computers, multiprocessor systems, microprocessor-based or programmable electronic devices, network PCs, or the like. In some embodiments, client devices 102-105 may include virtually any portable personal computing device capable of connecting to another computing device and receiving information such as, laptop computer 103, smart mobile telephone 104, and tablet computers 105, and the like. However, portable computing devices are not so limited and may also include other portable devices such as cellular telephones, display pagers, radio frequency (RF) devices, infrared (IR) devices, Personal Digital Assistants (PDAs), handheld computers, wearable computers, integrated devices combining one or more of the preceding devices, and the like. As such, client devices 102-105 typically range widely in terms of capabilities and features. Moreover, client devices 102-105 may access various computing applications, including a browser, or other web-based application.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), and the like, to display and send a message. In one embodiment, a user of the client device may employ the browser application to perform various activities over a network (online). However, another application may also be used to perform various online activities.

Client devices 102-105 also may include at least one other client application that is configured to receive and/or send content between another computing device. The client application may include a capability to send and/or receive content, or the like. The client application may further provide information that identifies itself, including a type, capability, name, and the like. In one embodiment, client devices 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client devices, TMSD 112, TCSD 114, TDSD 116, or other computing devices.

Client devices 102-105 may further be configured to include a client application that enables an end-user to log into an end-user account that may be managed by another computing device, such as TMSD 112, TCSD 114, TDSD 116, or the like. Such end-user account, in one non-limiting example, may be configured to enable the end-user to manage one or more online activities, including in one non-limiting example, search activities, social networking activities, browse various websites, communicate with other users, or the like. However, participation in such online activities may also be performed without logging into the end-user account. In some embodiments, a client device, as described herein, may be a set-top box device that is configured to stream content, such as IPTV, video and/or audio data, image data, and so on, on to a display device, such as a television. In these embodiments, the client device may be configured to execute one or more applications, which may provide content from a source, such as a content provider (not shown). In further embodiments, the one or more applications may include embedded code from a third party service, such as a partner of a content provider. Further, the embedded code may perform one or more functions, including collecting data associated with operating the set-top box device (e.g., collecting data representing which shows are selected by the user), optimizing the display or presentation of one or more features of the application, and so on. Non-limiting examples of the embedded code may include JavaScript, Swift code, and other suitable embeddable coding languages.

Wireless network 108 is configured to couple client devices 103-105 and its components with network 110. Wireless network 108 may include any of a variety of wireless sub-networks that may further overlay stand-alone ad-hoc networks, and the like, to provide an infrastructure-oriented connection for client devices 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile devices, such as client devices 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client devices 103-105 and another computing device, network, and the like.

Network 110 is configured to couple network devices with other computing devices, including, TMSD 112, TCSD 114, TDSD 116, client device 102, and client devices 103-105 through wireless network 108. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP). In essence, network 110 includes any communication method by which information may travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of TMSD 112 is described in more detail below in conjunction with FIG. 3. Briefly, however, TMSD 112 includes virtually any network device capable of monitoring tag latency. In at least one embodiment, TMSD 112 may asynchronously monitor the performance and latency of tags. Asynchronous monitoring may be performed independent of a request to load a web page (e.g., from a visitor to a website). TMSD 112 may emulate a browser to request a tag and determine tag latency. In at least one embodiment, TMSD 112 may determine the tag latency by calculating a time it takes the requested tag to load in the emulated browser. In some embodiments, TMSD 112 may communicate with TCSD 114 to determine which tags to monitor and/or to provide the determined tag latency. Devices that may be arranged to operate as TMSD 112 include various network devices, including, but not limited to personal computers, desktop computers, multiprocessor systems, microprocessor-based or programmable consumer electronics, network PCs, server devices, network appliances, and the like.

Although FIG. 1 illustrates TMSD 112 as a single computing device, the invention is not so limited. For example, one or more functions of the TMSD 112 may be distributed across one or more distinct network devices. Moreover, TMSD 112 is not limited to a particular configuration. Thus, in one embodiment, TMSD 112 may contain a plurality of network devices to monitor tag latency. In another embodiment, TMSD 112 may contain a plurality of network devices that operate using a master/slave approach, where one of the plurality of network devices of TMSD 112 operates to manage and/or otherwise coordinate operations of the other network devices. In other embodiments, the TMSD 112 may operate as a plurality of network devices within a cluster architecture, a peer-to-peer architecture, and/or even within a cloud architecture. Thus, the invention is not to be construed as being limited to a single environment, and other configurations, and architectures are also envisaged. In at least one embodiment, each of a plurality of TMSD 112 may be geographically distributed. For example, TMSD 112 may include a plurality of tag monitoring server devices that are located in various geographical locations. For example, a tag monitoring server device may be located within the United States and may monitor the tag latency for a tag deployed at a browser or application that is within the United States, and another tag monitoring server device may be located within Europe and may monitor tag latency for that same tag deployed at a browser or application that is within Europe. In some embodiments, TMSD 112 may not be located within a geographical region, but the TMSD 112 may still monitor tag latency for a tag that is deployed within that geographical region. In another embodiment, TMSD 112 may include a different computing device for monitoring tags in each of a plurality of different tag states.

In at least one embodiment, the system may be scaled up or down by adding or removing network devices, such as TMSD 112, to or from the system. In some embodiments, adding additional TMSDs to the system can enable higher throughput of tag monitoring. In at least one embodiment, each TMSD may be designed to enable system scaling such that scaling may be implemented without adding additional scaling features to each TMSD at the time of scaling.

At least one embodiment of TCSD 114 is described in more detail below in conjunction with FIG. 3. Briefly, however, TCSD 114 may include virtually any network device capable of controlling a state of each of a plurality of tags and enabling available tags to be deployed based on the tag's state. In some embodiment, TCSD 114 may communicate with TMSD 112 to determine which tags to monitor and/or may receive tag latency information. In some embodiments, TCSD 114 may provide TDSD 116 with a list of tags available for deployment. In at least one embodiment, TCSD 114 may communicate with a database (not shown), which may maintain tables for each tag state, which may include a list of each tag in that state. In some embodiments, TCSD 114 may include a database that stores the latency profile(s) for tags. Devices that may operate as TCSD 114 include various network devices, including, but not limited to personal computers, desktop computers, multiprocessor systems, microprocessor-based or programmable consumer electronics, network PCs, server devices, network appliances, and the like.

Although FIG. 1 illustrates TCSD 114 as a single computing device, the invention is not so limited. For example, one or more functions of the TCSD 114 may be distributed across one or more distinct network devices. Moreover, TCSD 114 is not limited to a particular configuration. Thus, in one embodiment, TCSD 114 may contain a plurality of network devices to control tag monitoring and/or deployment availability. Similarly, in another embodiment, TCSD 114 may contain a plurality of network devices that operate using a master/slave approach, where one of the plurality of network devices of TCSD 114 operates to manage and/or otherwise coordinate operations of the other network devices. In other embodiments, the TCSD 114 may operate as a plurality of network devices within a cluster architecture, a peer-to-peer architecture, and/or even within a cloud architecture. Thus, the invention is not to be construed as being limited to a single environment, and other configurations, and architectures are also envisaged.

At least one embodiment of TDSD 116 is described in more detail below in conjunction with FIG. 3. Briefly, however, TDSD 116 may include virtually any network device capable of deploying a tag. In some embodiments, TDSD 116 may be optimized to provide tags to websites upon a web request (e.g., a request from a visitor to the website to view a web page). In at least one embodiment, TDSD 116 may communicate with TCSD 114 to receive a list of tags available for deployment. In some embodiments, TDSD 116 may collect data about a web page and may record information about deployed tags. Devices that may operate as TDSD 116 include various network devices, including, but not limited to personal computers, desktop computers, multiprocessor systems, microprocessor-based or programmable consumer electronics, network PCs, server devices, network appliances, and the like.

Although FIG. 1 illustrates TDSD 116 as a single computing device, the invention is not so limited. For example, one or more functions of the TDSD 116 may be distributed across one or more distinct network devices. Moreover, TDSD 116 is not limited to a particular configuration. Thus, in one embodiment, TDSD 116 may contain a plurality of network devices to deploy tags to web pages. Similarly, in another embodiment, TDSD 116 may contain a plurality of network devices that operate using a master/slave approach, where one of the plurality of network devices of TDSD 116 operates to manage and/or otherwise coordinate operations of the other network devices. In other embodiments, the TDSD 116 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
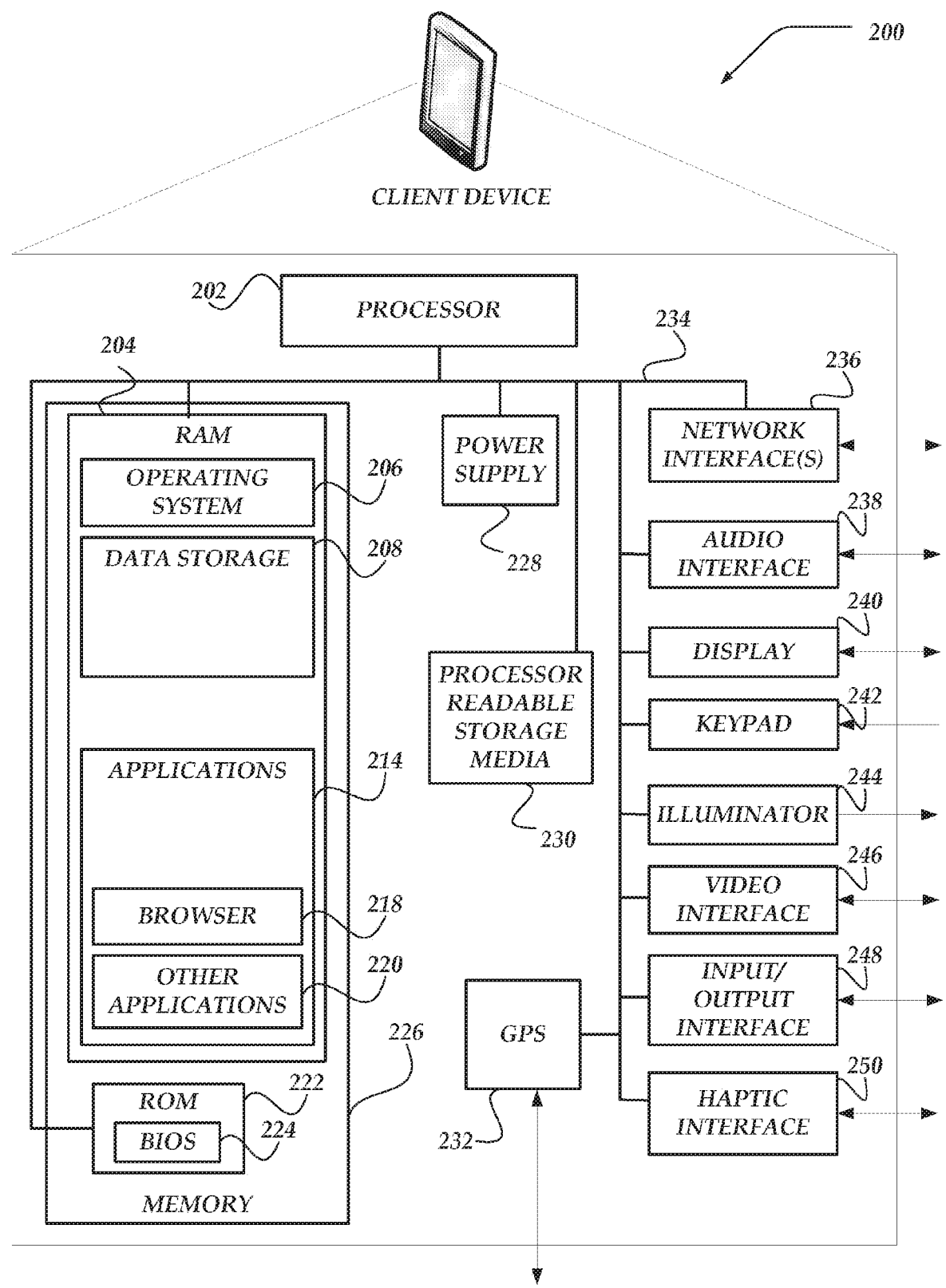
FIG. 2 shows an embodiment of a client device that may be included in a system such as that shown in FIG. 1.

FIG. 2 shows one embodiment of client device 200 that may be included in a system implementing embodiments of the invention. Client device 200 may include many more or less components than those shown in FIG. 2. However, the components shown are sufficient to disclose an illustrative embodiment for practicing the present invention. Client device 200 may represent, for example, one embodiment of at least one of client devices 102-105 of FIG. 1.

As shown in the figure, client device 200 includes a processor 202 in communication with a mass memory 226 via a bus 234. In some embodiments, processor 202 may include one or more central processing units (CPU). Client device 200 also includes a power supply 228, one or more network interfaces 236, an audio interface 238, a display 240, a keypad 242, an illuminator 244, a video interface 246, an input/output interface 248, a haptic interface 250, and a global positioning system (GPS) receiver 232.

Power supply 228 provides power to client device 200. A rechargeable or non-rechargeable battery may be used to provide power. The power may also be provided by an external power source, such as an alternating current (AC) adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client device. For example, the haptic interface 250 may be employed to vibrate client device 200 in a particular way when another user of a computing device is calling. In some embodiments, haptic interface 250 may be optional.

Client device 200 may also include GPS transceiver 232 to determine the physical coordinates of client device 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control (MAC) address, IP address, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Microsoft Corporation's Windows Mobile™ Apple Corporation's iOS™, Google Corporation's Android™ or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store message, we page content, or any of a variety of user generated content. At least a portion of the information may also be stored on another component of network device 200, including, but not limited to processor readable storage media 230, a disk drive or other computer readable storage devices (not shown) within client device 200.

Processor readable storage media 230 may include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device. Processor readable storage media 230 may also be referred to herein as computer readable storage media and/or computer readable storage device.

Applications 214 may include computer executable instructions which, when executed by client device 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client device. Applications 214 may include, for example, browser 218, and other applications 220. Other applications 220 may include, but are not limited to, calendars, search programs, email clients, IM applications, SMS applications, voice over Internet Protocol (VOIP) applications, contact managers, task managers, transcoders, database programs, word processing programs, security applications, spreadsheet programs, games, search programs, and so forth.

Browser 218 may include virtually any application configured to receive and display graphics, text, multimedia, messages, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client device 200 to communicate with another network device, such as TMSD 112, TCSD 114, and/or TDSD 116 of FIG. 1.

Illustrative Network Device

Figure 3:
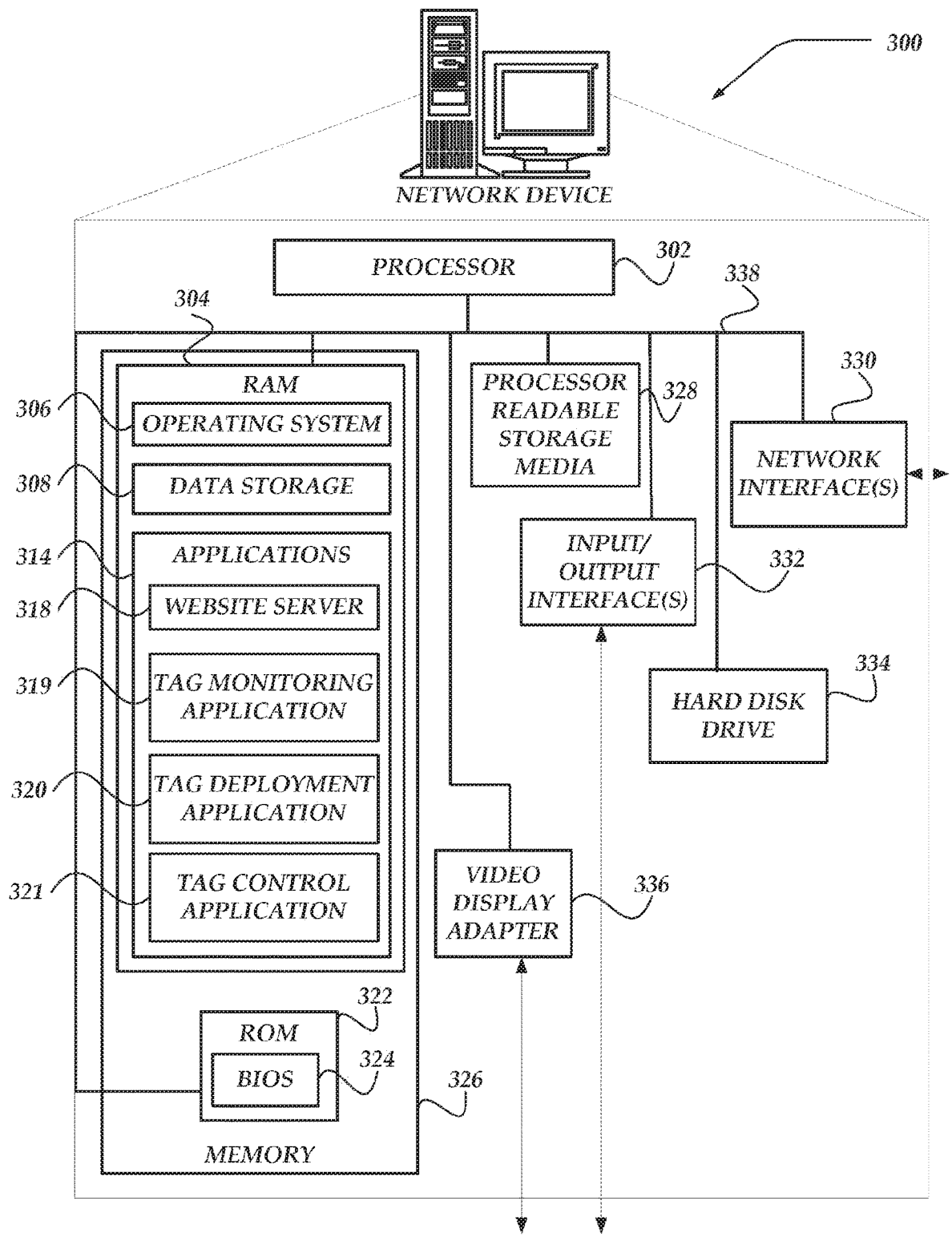
FIG. 3 shows an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, client, peer, a host, or any other device. Network device 300 may represent, for example TMSD 112, TCSD 114, TDSD 116 of FIG. 1, and/or other network devices.

Network device 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network device 300. Any general-purpose operating system may be employed. Basic input/output system (BIOS) 324 is also provided for controlling the low-level operation of network device 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 326 further includes one or more data storage 308, which can be utilized by network device 300 to store, among other things, applications 314 and/or other data. For example, data storage 308 may also be employed to store information that describes various capabilities of network device 300. The information may then be provided to another device based on any of a variety of events, including being sent as part of a header during a communication, sent upon request, or the like. Data storage 308 may also be employed to store messages, web page content, or the like. At least a portion of the information may also be stored on another component of network device 300, including, but not limited to processor readable storage media 328, hard disk drive 334, or other computer readable storage medias (not shown) within client device 300

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In at least one embodiment data storage 308 may include at least one state table to indicate which tags are in a particular state. In one embodiment, at least some of data store 308 might also be stored on another component of network device 300, including, but not limited to processor-readable storage media 328, hard disk drive 334, or the like.

Applications 314 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 314 may also include website server 318, Tag Monitoring Application (TMA) 319, Tag Deployment Application (TDA) 320, and Tag Control Application (TCA) 321.

Website server 318 may represents any of a variety of information and services that are configured to provide content, including messages, over a network to another computing device. Thus, website server 318 can include, for example, a web server, a File Transfer Protocol (FTP) server, a database server, a content server, or the like. Website server 318 may provide the content including messages over the network using any of a variety of formats including, but not limited to WAP, HDML, WML, SGML, HTML, XML, Compact HTML (cHTML), Extensible HTML (xHTML), or the like.

TMA 319 may be configured to asynchronously monitor tag latency. In at least one embodiment, TMA 319 may asynchronously monitor tag latency independent of a request to load a web page (e.g., from a visitor to a website). TMA 319 may emulate a browser to request a tag and determine tag latency. In at least one embodiment, TMA 319 may determine the tag latency by calculating a time it takes the request tag to load in the emulated browser. In some embodiments, TMA 319 may be employed by TMSD 112 of FIG. 1. In any event, TMA 319 may employ processes, or parts of processes, similar to those described in conjunction with FIGS. 4-7, and 9A-9B to perform at least some of its actions.

TDA 320 may be configured to deploy a tag. In some embodiments, TDA 320 may provide tags to websites upon request (e.g., a request from a visitor to the website to view a web page). In at least one embodiment, TDA 320 may collect data about a web page and may record information about deployed tags. In some embodiments, TDA 320 may be employed by TDSD 116 of FIG. 1. In any event, TDA 319 may employ processes, or parts of processes, similar to those described in conjunction with FIGS. 4-7, and 9A-9B to perform at least some of its actions.

TCA 321 may be configured to control a state of each of a plurality of tags. In some embodiments, TCA 321 may be configured to notify and/or provide TMA 319 with each tag that may be ready to be monitored. In some embodiments, TCA 321 may record a last time a tag was checked (i.e., when a tag latency is determined for a tag), which may be utilized to determine a next time to check the tag. In at least one embodiment, TCA 321 may record tag measurements (e.g., tag latency) that are returned from TMA 319. These measurements may be utilized by TCA 321 to determine if a state of a tag should be changed or may be utilized for historical reporting purposes.

In at least one embodiment, TCA 321 may change a state of a tag. In some embodiments, TCA 321 may modify a state table to add or remove a tag from a given state. In some embodiments, TCA 321 may be configured to enable available tags for deployment or block tags from deployment (i.e., disable tags) based on a tag's state. In at least one embodiment, TCA 321 may be configured to provide and/or notify TDA 320 of tags available for deployment. In some embodiments, TCA 321 may be employed by TCSD 114 of FIG. 1. In any event, TCA 321 may employ processes, or parts of processes, similar to those described in conjunction with FIGS. 4-7, and 9A-9B to perform at least some of its actions.

General Operation

Figure 4:
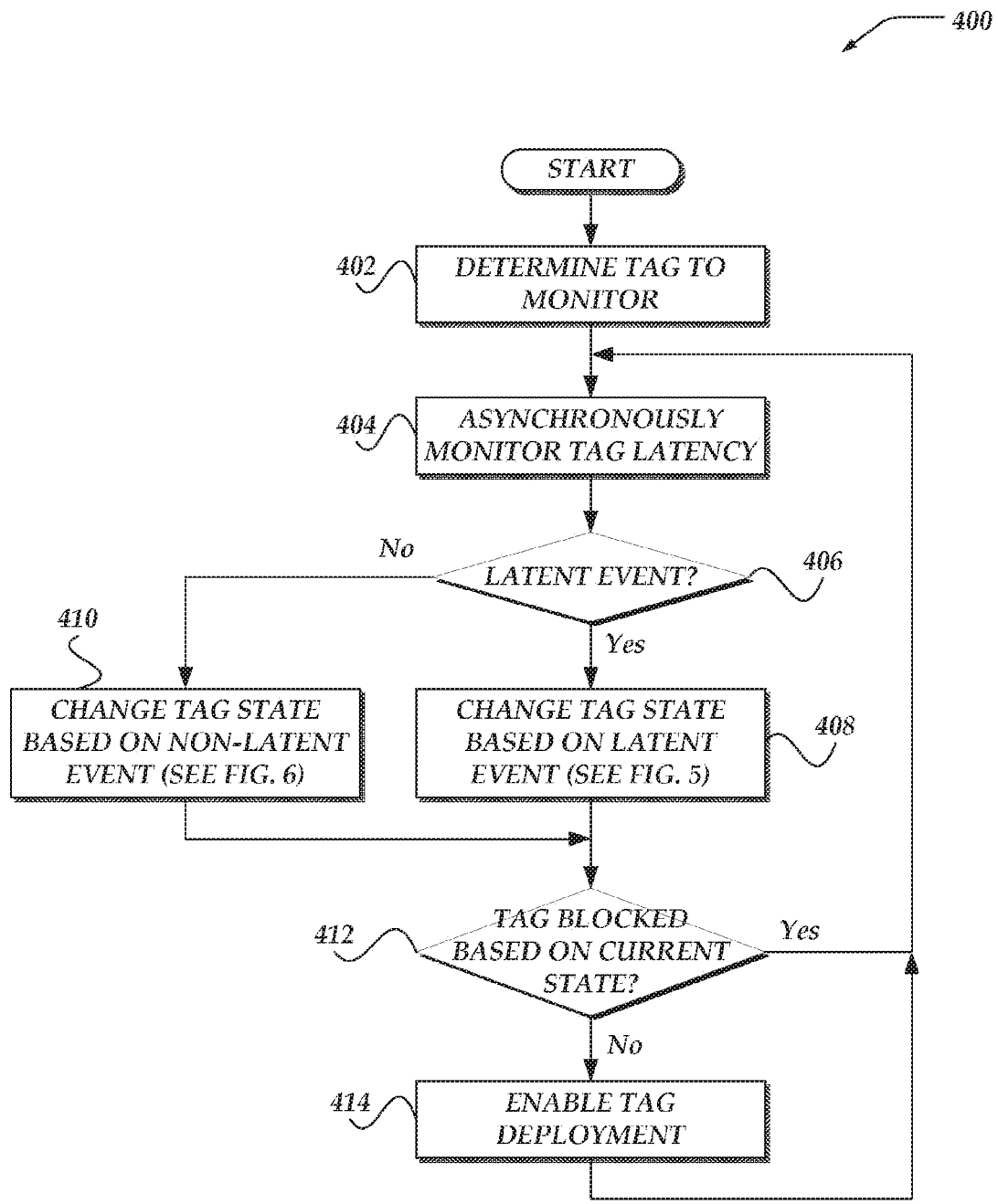
FIG. 4 illustrates a logical flow diagram generally showing one embodiment of an overview process for changing a tag state based on asynchronous monitoring of the tag's latency and enabling the tag for deployment based on a state of the tag.

The operation of certain aspects of the invention will now be described with respect to FIGS. 4-7. FIG. 4 illustrates a logical flow diagram generally showing one embodiment of an overview process for changing a tag state based on asynchronous monitoring of the tag's latency and enabling the tag for deployment based on a state of the tag. In some embodiments, process 400 of FIG. 4 may be implemented by and/or executed on a single network device, such as network device 300 of FIG. 3. In other embodiments, process 400 or portions of process 400 of FIG. 4 may be implemented by and/or executed on a plurality of network devices, such as network device 300 of FIG. 3. In at least one of various embodiments, process 400 may be performed for each of a plurality of tags.

Process 400 begins, after a start block, at block 402, where a tag may be determined for monitoring. In some embodiments, each of a plurality of tags may be monitored, wherein each tag may be associated with at least one web page. In other embodiments, a portion of the plurality of tags may be monitored and another portion of the plurality of tags may not be monitored. In at least one embodiment, the tags to be monitored may be predetermined, determined, modified by a user, or the like.

In some embodiments, a tag may be in one of a plurality of different states. Each state may enable a tag to be deployed or may block a tag from being deployed. A tag's state may change from one state to another state based on the monitoring, a time a tag is in a state, or the like, or a combination thereof. In some embodiments, different triggers (i.e., a number of consecutive latent events) may be employed for moving a tag from one state to another state. Embodiments of processes for changing a tag's state are described in more detail below in conjunction with FIGS. 7 and 9A-9B. In at least one embodiment, a tag may be in one of the following states: NORMAL, FLAGGED, SUSPENSION A, or SUSPENSION B. One embodiment of a graphic illustration of these different states is described in more detail below in conjunction with FIG. 8.

However, embodiments are not so limited and other numbers of states, types of states, algorithms/metrics for state changes, or the like, may be employed. For example, in at least one embodiment, a tag may be in one of the following states: NORMAL, FLAGGED, PRE-SUSPENDED, SUSPENDED, or POST-SUSPENDED. One embodiment of a graphic illustration of these different states is described in more detail below in conjunction with FIG.

10. In another embodiment, historical records of measurements (e.g., tag latency) may be utilized to modify the number of states and/or types of states, the metrics utilized to change a tag's state, or the like. For example, historical records may indicate that tags may become stuck in a specific state for prolonged periods of time. In one such example, an additional state may be added, which may be utilized to monitor tags more frequently. In another example, if historical records may indicate that a tag routinely results in latent events at a given time (e.g., because of routine server maintenance), then the tag may be preemptively moved to a different state at the given time.

In any event, process 400 continues at block 404, where tag latency may be asynchronously monitored. In some embodiments, monitoring may be asynchronous if it is independent of a request for a web page from a visitor to the web page. In at least one embodiment, the monitoring may be based on at least a state of the tag to be monitored. In some embodiments, a tag's state may determine a rate and/or frequency at which to monitor the tag. In some embodiments, the rate at which to monitor tag may be configurable and/or modifiable for each individual state. In one embodiment, each state may correspond to a different frequency for asynchronously monitoring a tag. For example, a tag in a NORMAL state may monitored every 15 minutes, a tag in a FLAGGED state may be monitored every five minutes, a tag in a SUSPENSION B state may be monitored every minute, while a tag in a SUSPENSION_A state may be idle and not monitored for a predetermined amount of time. However, embodiments are not so limited and other frequencies for periodically monitoring tag latency may be employed.

In some other embodiments, a latency to monitor the tag may be determined. In at least one embodiment, the latency may be determined by measuring a time from a tag request to receipt of a server response. However, embodiments are not so limited and other methods for determining the tag latency may be employed, which is described in more detail above.

Process 400 next proceeds to decision block 406, where a determination may be made whether the tag latency resulted in a latent event. In at least one embodiment, the tag latency may be compared to a maximum time latency threshold. If the tag latency is greater than the maximum time latency threshold, then the result of the tag monitoring may indicate a latent event occurred. In at least one embodiment, the maximum time latency threshold may be configured and/or modifiable for each user and/or each state. Accordingly, the maximum time latency threshold may be the same and/or different for each user and/or state. If the tag latency is less than the maximum time latency threshold, then the result of the tag monitoring may indicate a non-latent event occurred. If a latent event occurred, then processing may flow to block 408; otherwise, a non-latent event may have occurred and processing may flow to block 410.

At block 408, a tag state may be changed based on the latent event, which is described in more detail below in conjunction with FIG. 5. Briefly, however, if a determination of the latency (e.g., consecutive latent events) and the state of the tag indicates a modification to the state, then the state of the tag may be modified to another state. In some embodiment, a tag may change states based on a current state of the tag and if a number of latent events exceeds a latent event threshold. For example, in some embodiments, a tag may change from a NORMAL state to a FLAGGED state if a threshold number of latent events is exceeded. In other embodiments, a tag may change from a FLAGGED state to a SUSPENSION A state, if a threshold number of latent events is exceeded. In yet other embodiments, a tag may change from a SUSPENSION B state to a SUSPENSION A state if a threshold number of latent events is exceeded. In some embodiments, the latent event threshold may be any suitable number of consecutive latent events, such as, for example, 1-3 consecutive latent events. In other embodiments, the latent event threshold may be any suitable number of latent events that occur within a given period of time (e.g., 3 latent events in five minutes). However, embodiments are not so limited, and the latent event threshold may be based on other metrics/algorithms to determine if a tag is moved from a given state and which state the tag is moved to.

For example, a tag may change from one state to another state based on: a severity of a latent event (e.g., a tag latency value above a severity threshold value), a number of consecutive latent events above the severity threshold, a number of latent events above the severity threshold within a predetermined time period, a time duration a tag is in a given state, or the like, or any combination thereof. In some embodiments, the latent event threshold employed at each state may be individually configurable and/or modifiable. In at least one embodiment, each of these latent event thresholds may be separately configured for each user. Processing then proceeds to decision block 412.

If, at decision block 406, it is determined that a non-latent event occurred, then processing may flow from decision block 406 to block 410. At block 410, a state of the tag may be changed based on the non-latent event, which is described in more detail below in conjunction with FIG. 6. Briefly, however, if a determination of the latency (e.g., consecutive non-latent events) and the state of the tag indicates a modification to the state, then the state of the tag may be modified to another state. In some embodiment, a tag may change states based on a current state of the tag and if a number of latent events exceeds a non-latent event threshold.

In some embodiments, a tag may change from a FLAGGED state to a NORMAL state, if a threshold number of non-latent events is exceeded. In other embodiments, a tag may change from a SUSPENSION B state to a FLAGGED state if a threshold number of non-latent events is exceeded. In some embodiments, the non-latent event threshold may be any suitable number of consecutive non-latent events, such as, for example, 1-3 non-latent consecutive events. In other embodiments, the non-latent event threshold may be any suitable number of non-latent events that occur within a given period of time (e.g., 3 non-latent events in one minute). However, embodiments are not so limited, and the non-latent event threshold may be based on other metrics/algorithms to determine if a tag is moved from a given state and which state the tag is moved to.

For example, a tag may change from one state to another state based on: a mildness of one or more non-latent events (e.g., a tag latency value below a mildness threshold value), a number of consecutive non-latent events below the mildness threshold, a number of non-latent events below the mildness threshold within a predetermined time period, a time duration a tag is in a given state, or the like, or any combination thereof. In some embodiments, the non-latent event threshold employed at each state may be individually configurable and/or modifiable. In at least one embodiment, each of these non-latent event thresholds may be separately configured for each user.

Process 400 next proceeds to decision block 412, where a determination may be made whether the tag is blocked from being deployed based on a current state of the tag. In some embodiments, a tag in a NORMAL state and/or a FLAGGED state may not be blocked and may be allowed to be deployed. In other embodiments, a tag in a SUSPENSION_A state and/or a SUSPENSION_B state may be blocked and may not be allowed to be deployed. If the tag is blocked from being deployed, then processing may loop to block 404 to continue to asynchronously monitor tag latency; otherwise, processing may flow to block 414.

At block 414, the tag may be enabled to be deployed. In some embodiments, enabling a tag to be deployed may include notifying a web page that a tag can be requested and loaded in the web page if a web page request is provided. In other embodiments, enabling a tag to be deployed may include notifying a tag deployment device, such as TDSD 116 of FIG. 1, to request and load the tag if a request for a web page is provided. In at least one embodiment, tags enabled for deployment may be included in a table or list of tags available for deployment. In some embodiments, if a determination of a current state of the tag affirmatively indicates deployment (as determined by block 412) and a web page is requested, the tag may be deployed with the associated web page.

After block 414, process 400 may loop to block 404 to continue to asynchronously monitor tag latency.

Figure 5:
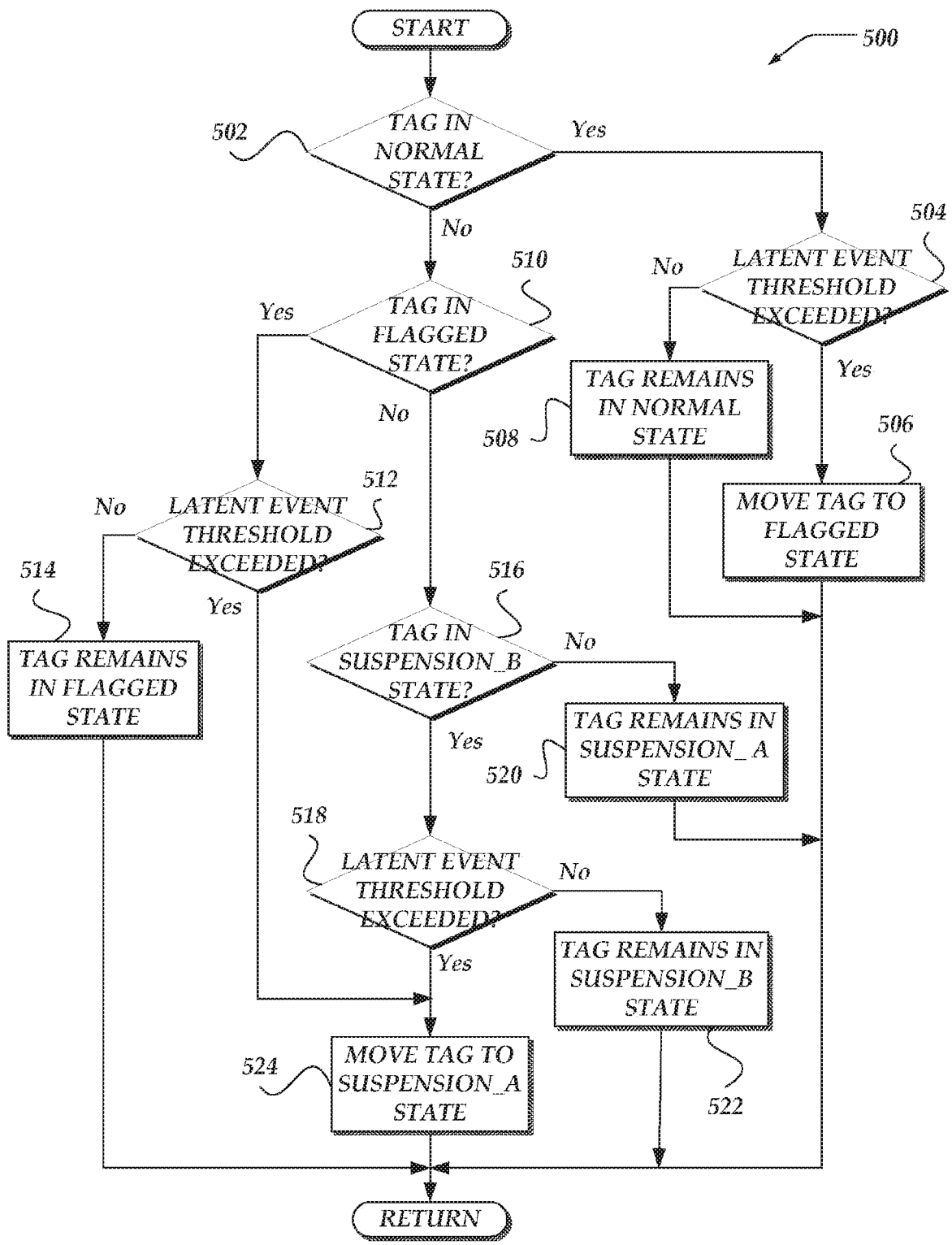
FIG. 5 illustrates a logical flow diagram generally showing one embodiment of a process for changing a tag state based on a latent event of the tag and a current state of the tag.

FIG. 5 illustrates a logical flow diagram generally showing one embodiment of a process for changing a tag state based on a latent event of the tag and a current state of the tag. In some embodiments, process 500 of FIG. 5 may be implemented by and/or executed on a single network device, such as network device 300 of FIG. 3. In other embodiments, process 500 or portions of process 500 of FIG. 5 may be implemented by and/or executed on a plurality of network devices, such as network device 300 of FIG. 3.

Process 500 begins, after a start block, at decision block 502, where a determination may be made whether the tag is in a NORMAL state. In at least one embodiment, each state (i.e., NORMAL state, FLAGGED state, SUSPENSION_A state, and/or SUSPENSION B state) may correspond to a table that identifies the tags in that particular state. For example, a normal tag table may identify tags in the NORMAL state; a flagged tag table may identify tags in the FLAGGED state; a SUSPENSION_A tag table may identify tags in the SUSPENSION_A state; and a SUSPENSION_B tag table may identify tags in the SUSPENSION B state. In some embodiments, a tag may be determined to be in the NORMAL state if the tag is included in the normal tag table. If the tag is in the NORMAL state, then processing may flow to decision block 504; otherwise, processing may flow to decision block 510. In some embodiments, the state of a tag may include one or more component items of information. For example, a first component item of the state of a tag may indicate that the tag is deployed in Europe, and the second component item of the state may indicate that the tag is in the NORMAL state.

At decision block 504, a determination may be made whether a latent event threshold is exceeded. In some embodiments, the latent event threshold may be a total number of consecutive latent events. In one non-limiting, non-exhaustive example, the latent event threshold for the NORMAL state may be one latent event. In at least one such embodiment, determining if the latent event threshold is exceeded may include comparing a number of consecutive latent events to the latent event threshold. In other embodiments, the latent event threshold may be a total number of latent events that occurred within a given time period. However, embodiments are not so limited and other latent event thresholds may be employed. If the latent event threshold is exceeded, then processing may flow to block 506; otherwise, processing may flow to block 508.

At block 506, the tag may be moved to the FLAGGED state. In at least one embodiment, moving the tag to the FLAGGED state may include removing the tag from the NORMAL tag table and adding the tag to the FLAGGED tag table. However, embodiments are not so limited and other methods of identifying and changing the tag state may be employed. In some embodiments, a tag in the FLAGGED state may not be blocked and may be enabled to be deployed. In at least one embodiment, an email, text message, or other notification may be sent to a user to indicate that the tag was moved to the FLAGGED state. In some other embodiments, if the tag returns an error (e.g., HTTP 4xx|5xx responses) when the tag latency of the tag is monitored, then the tag may be moved to the FLAGGED state. After block 506, process 500 may return to a calling process to perform other actions.

If, at decision block 504, it is determined that the latent event threshold is not exceeded, then processing may flow from decision block 504 to block 508. At block 508, the tag may remain in the NORMAL state. In at least one embodiment, a tag in the NORMAL state may not be blocked and may be enabled to be deployed. After block 506, process 500 may return to a calling process to perform other actions.

If, at decision block 502, it is determined that the tag is not in the NORMAL state, then processing may flow from decision block 502 to decision block 510. At decision block 510, a determination may be made whether the tag is in the FLAGGED state. In some embodiments, a tag may be determined to be in the FLAGGED state if the tag is included in the flagged tag table. If the tag is in the FLAGGED state, then processing may flow to decision block 512; otherwise, processing may flow to decision block 516.

At decision block 512, a determination may be made whether a latent event threshold is exceeded. In at least one embodiment, decision block 512 may employ embodiments of decision block 504 to determine if the latent event threshold is exceeded. In some embodiments, the latent event threshold for the FLAGGED state may be the same or different than the latent event threshold for the NORMAL state. In one non-limiting example, non-exhaustive example, the threshold number of latent events for the FLAGGED state may be three consecutive latent events. However, embodiments are not so limited and other latent event thresholds may be employed. If the latent event threshold is exceeded, then processing may flow to block 524; otherwise, processing may flow to block 514.

At block 514, the tag may remain in the flagged state. In at least one embodiment, a tag in the FLAGGED state may not be blocked and may be enabled to be deployed. After block 514, process 500 may return to a calling process to perform other actions.

If, at decision block 510, it is determined that the tag is not in the FLAGGED state, then processing may flow from decision block 510 to decision block 516. At decision block 516, a determination may be made whether the tag is in the SUSPENSION B state. In some embodiments, a tag may be determined to be in the SUSPENSION_B state if the tag is included in the SUSPENSION_B tag table. If the tag is in the SUSPENSION_B state, then processing may flow to decision block 518; otherwise, the tag may be in the SUSPENSION_A state and processing may flow to decision block 520.

At block 520, the tag may remain in the SUSPENSION A state. In at least one embodiment, a tag in the SUSPENSION A state may be blocked and may not be enabled to be deployed. In some embodiments, a tag may stay in the SUSPENSION A state for a predetermined period of time, independent of latent and/or non-latent events. After block 520, process 500 may return to a calling process to perform other actions.

If, at decision block 516, it is determined that the tag is in the SUSPENSION B state, then processing may flow from decision block 516 to decision block 518. At decision block 518, a determination may be made whether a latent event threshold is exceeded. In at least one embodiment, decision block 518 may employ embodiments of decision block 504 to determine if the latent event threshold is exceeded. In some embodiments, the latent event threshold for the SUSPENSION B state may be the same or different than the latent event threshold for the NORMAL state and/or the FLAGGED state. In one non-limiting, non-exhaustive example, the threshold number of latent events for the SUSPENSION_B state may be three consecutive latent events. However, embodiments are not so limited and other latent event thresholds may be employed. If the latent event threshold is exceeded, then processing may flow to block 524; otherwise, processing may flow to block 522.

At block 524, the tag may be moved to the SUSPENSION_A state. In at least one embodiment, moving the tag to the SUSPENSION A state may include adding the tag to the SUSPENSION A tag table and removing the tag from the FLAGGED tag table or the SUSPENSION B tag table. In some embodiments, a tag in the SUSPENSION A state may be blocked and may not be enabled to be deployed. After block 524, process 500 may return to a calling process to perform other actions.

If, at decision block 518, it is determined that the latent event threshold is not exceeded, then processing may flow from decision block 518 to block 522. At block 522, the tag may remain in the SUSPENSION_B state. In some embodiments, a tag in the SUSPENSION B state may be blocked and may not be enabled to be deployed. After block 522, process 500 may return to a calling process to perform other actions.

Figure 6:
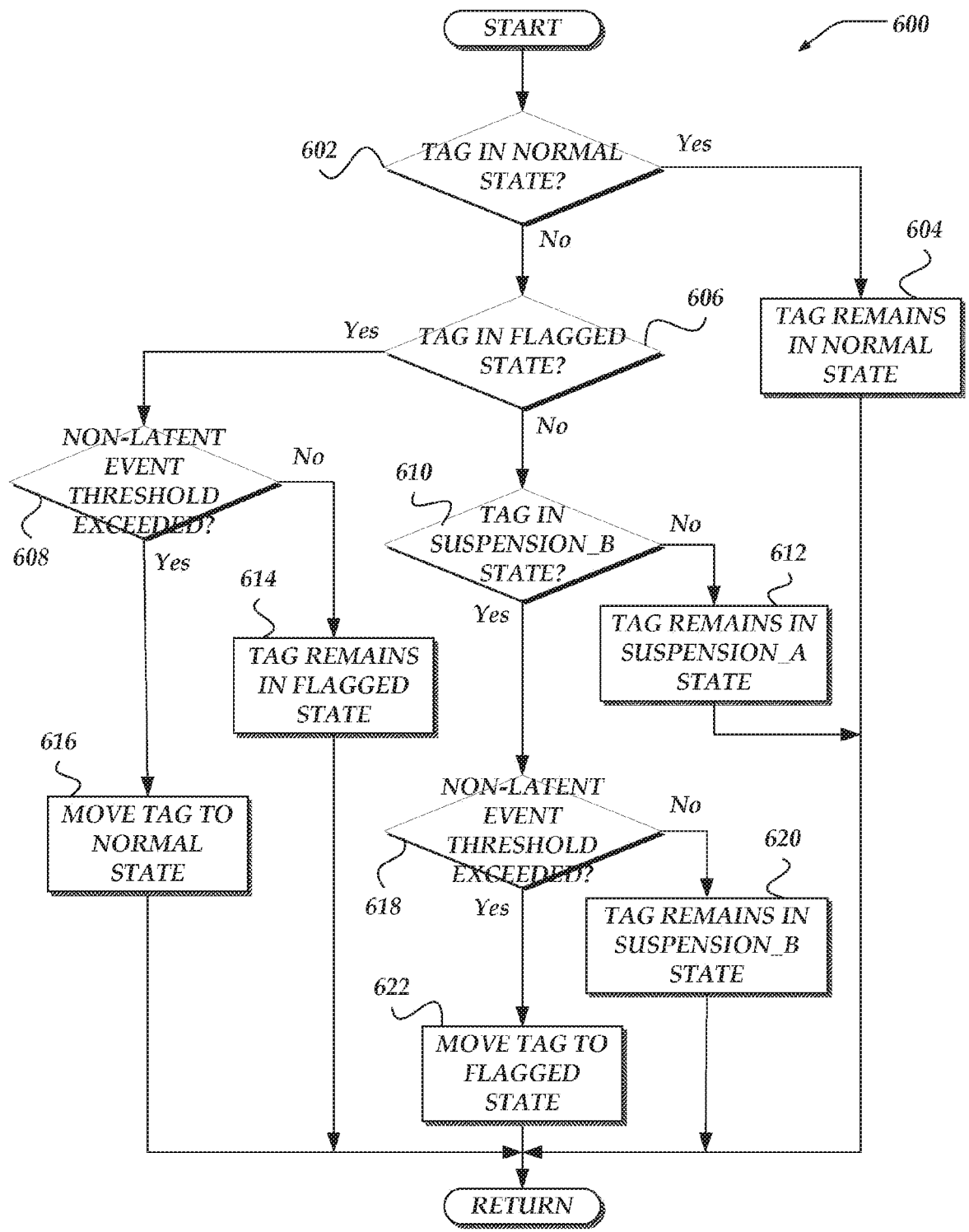
FIG. 6 illustrates a logical flow diagram generally showing one embodiment of a process for changing a tag state based on a non-latent event of the tag and a current state of the tag.

FIG. 6 illustrates a logical flow diagram generally showing one embodiment of a process for changing a tag state based on a non-latent event of the tag and a current state of the tag. In some embodiments, process 600 of FIG. 6 may be implemented by and/or executed on a single network device, such as network device 300 of FIG. 3. In other embodiments, process 600 or portions of process 600 of FIG. 6 may be implemented by and/or executed on a plurality of network devices, such as network device 300 of FIG. 3.

Process 600 begins, after a start block, at decision block 602, where a determination may be made whether the tag is in the NORMAL state. In at least one embodiment, decision block 602 may employ embodiments of decision block 502 of FIG. 5 to determine if the tag is in the NORMAL state. If the tag is in the NORMAL state, then processing may flow to block 604; otherwise, processing may flow to decision block 606.

At block 604, the tag may remain in the NORMAL state and the tag allowed to be deployed. In at least one embodiment, block 604 may employ embodiments of block 508 of FIG. 5. After block 604, process 600 may return to a calling process to perform other actions.

If, at decision block 602, it is determined that the tag is not in the NORMAL state, then processing may flow from decision block 602 to decision block 606. At decision block 606, a determination may be made whether the tag is in the FLAGGED state. In at least one embodiment, decision block 606 may employ embodiments of decision block 510 of FIG. 5 to determine if the tag is in the FLAGGED state. If the tag is in the FLAGGED state, then processing may flow to decision block 608; otherwise, processing may flow to decision block 610.

At decision block 608, a determination may be made whether a non-latent event threshold is exceeded. In some embodiments, the non-latent event threshold may be a total number of consecutive non-latent events. In one non-limiting, non-exhaustive example, the non-latent event threshold for the FLAGGED state may be three consecutive non-latent events. In at least one such embodiment, determining if the non-latent event threshold is exceeded may include comparing a number of consecutive non-latent events to the non-latent event threshold. In other embodiments, the non-latent event threshold may be a total number of non-latent events that occurred within a given time period. However, embodiments are not so limited and other non-latent event thresholds may be employed. If the non-latent event threshold is exceeded, then processing may flow to block 616; otherwise, processing may flow to block 614.

At block 616, the tag may be moved to the NORMAL state. In at least one embodiment, moving the tag to the NORMAL state may include removing the tag from the FLAGGED tag table and adding the tag to the NORMAL tag table. However, embodiments are not so limited and other methods of identifying and changing the tag state may be employed. In some embodiments, a tag in the NORMAL state may not be blocked and may be enabled to be deployed. In some other embodiments, a tag may return to the NORMAL state if a user resets the tag state, a tag's HTML field is edited, monitoring of the tag is disabled, and/or a geographical region to monitor the tag is changed (i.e., a user may select a geographical location of servers to monitor tags). After block 616, process 600 may return to a calling process to perform other actions.

If, at decision block 608, it is determined that the non-latent event threshold is not exceeded, then processing may flow from decision block 608 to block 614. At block 614, the tag may remain in the FLAGGED state. In at least one embodiment, block 614 may employ embodiments of block 514 of FIG. 5. After block 614, process 600 may return to a calling process to perform other actions.

If, at decision block 606, it is determined that the tag is not in the FLAGGED state, then processing may flow from decision block 606 to decision block 610. At decision block 610, a determination may be made whether the tag is in the SUSPENSION B state. In at least one embodiment, decision block 610 may employ embodiments of decision block 516 of FIG. 5 to determine if the tag is in the SUSPENSION_B state. If the tag is in the SUSPENSION_B state, then processing may flow to decision block 618; otherwise, processing may flow to decision block 612.

At block 612, the tag may remain in the SUSPENSION_A state. In at least one embodiment, block 612 may employ embodiments of block 520 of FIG. 5. After block 612, process 600 may return to a calling process to perform other actions.

If, at decision block 610, it is determined that the tag is not in the SUSPENSION B state, then processing may flow from decision block 610 to decision block 618. At decision block 618, a determination may be made whether a non-latent event threshold is exceeded. In at least one embodiment, decision block 618 may employ embodiments of decision block 608 to determine if the non-latent event threshold is exceeded. In some embodiments, the non-latent event threshold for the SUSPENSION A state may be the same or different than the non-latent event threshold for the FLAGGED state. In one non-limiting, non-exhaustive example, the threshold number of NON-latent events for the SUSPENTION_A state may be three consecutive non-latent events. However, embodiments are not so limited and other non-latent event thresholds may be employed. If the non-latent event threshold is exceeded, then processing may flow to block 622; otherwise, processing may flow to block 620.

At block 622, the tag may be moved to the FLAGGED state. In at least one embodiment, block 622 may employ embodiments of block 506 of FIG. 5. After block 622, process 600 may return to a calling process to perform other actions.

If, at decision block 618, it is determined that the non-latent event threshold is not exceeded, then processing may flow from decision block 618 to block 620. At block 620, the tag may remain in the SUSPENSION B state. In at least one embodiment, block 620 may employ embodiments of block 522 of FIG. 5. After block 620, process 600 may return to a calling process to perform other actions.

Figure 7:
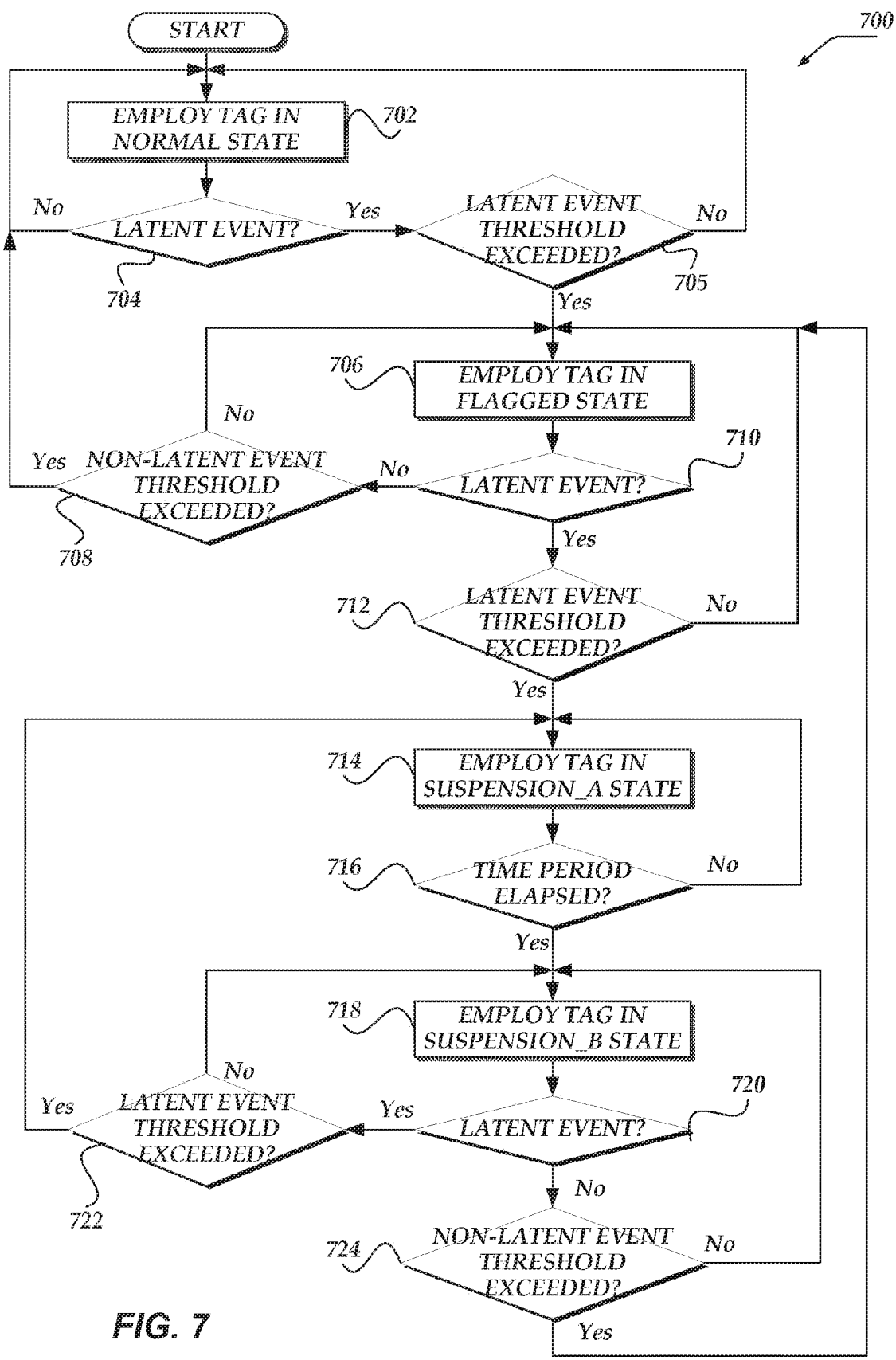
FIG. 7 illustrates a logical flow diagram generally showing one embodiment of a process for employing a tag in one of a plurality of states and changing the tag state based on latent or non-latent event.

FIG. 7 illustrates a logical flow diagram generally showing one embodiment of a process for employing a tag in one of a plurality of states and changing the tag state based on latent or non-latent event. In some embodiments, process 700 of FIG. 7 may be implemented by and/or executed on a single network device, such as network device 300 of FIG. 3. In other embodiments, process 700 or portions of process 700 of FIG. 7 may be implemented by and/or executed on a plurality of network devices, such as network device 300 of FIG. 3.

Process 700 begins, after a start block, at block 702, where a tag may be employed in a NORMAL state. In at least one embodiment, a tag in the NORMAL state may not be blocked and may be enabled to be deployed. As described above (at block 404), a latency of the tag may be asynchronously monitored. In at least one embodiment, the tag latency of a tag in the NORMAL state may be monitored every 15 minutes. However, other frequencies for monitoring tags in the flagged state may be employed.

Process 700 continues at decision block 704, where a determination may be made whether a latent event for the tag has occurred. In at least one embodiment, decision block 704 may employ embodiments of decision block 406 of FIG. 4 to determine if a latent event has occurred based on the asynchronously monitored tag latency. If a latent event has occurred, then processing may flow to decision block 705; otherwise, processing may loop to block 702, where the tag may remain in the NORMAL state.

At decision block 705, a determination may be made whether a latent event threshold is exceeded. In at least one embodiment, decision block 705 may employ embodiments of decision block 504 of FIG. 5 to determine if a latent event threshold is exceeded for the tag in the NORMAL state. If the latent event threshold is exceeded, then the tag may be moved to the FLAGGED state and processing may flow to block 706; otherwise, processing may loop to block 702, where the tag may remain in the NORMAL state. In some embodiments, process 700 may employ embodiments of block 506 of FIG. 5 to move a tag to the FLAGGED state.

At block 706, the tag may be employed in the FLAGGED state. In at least one embodiment, a tag in the FLAGGED state may not be blocked and may be enabled to be deployed. In at least one embodiment, the tag latency of a tag in the FLAGGED state may be monitored every five minutes. However, other frequencies for monitoring tags in the FLAGGED state may be employed.

In some embodiments, a user may manually move a tag in the FLAGGED state to the NORMAL by "resetting" the tag. In at least one embodiment, a user may move a tag to the NORMAL state by clicking on a "reset" button. However, embodiments are not so limited and other embodiments for resetting a tag and/or manually moving a tag to the NORMAL state may be employed. In at least one embodiment, manually moving a tag may occur independent of the process for monitoring the tag's latency. If the tag in the FLAGGED state is manually "reset" to the NORMAL state, then process 700 may loop (not shown) to block 702. In at least one embodiment, a tag in any state (and/or predetermined states) may be "reset" to the NORMAL state.

In any event, process 700 continues at decision block 710, where a determination may be made whether a latent event for the tag has occurred. In at least one embodiment, decision block 710 may employ embodiments of decision block 704 to determine if a latent event has occurred. If a latent event has occurred, then processing may flow to decision block 712; otherwise, processing may flow to decision block 708.

At decision block 708, a determination may be made whether a non-latent event threshold is exceeded. In at least one embodiment, decision block 708 may employ embodiments of decision block 608 of FIG. 6 to determine if a non-latent event threshold is exceeded for the tag in the FLAGGED state. If the non-latent event threshold is exceeded, then the tag may be moved to the NORMAL state and processing may flow to block 702; otherwise, processing may loop to block 706, where the tag may remain in the FLAGGED state. In some embodiments, process 700 may employ embodiments of block 616 of FIG. 6 to move a tag to the NORMAL state.

If, at decision block 710, a latent event has occurred, then processing may flow from decision block 710 to decision block 712. At decision block 712, a determination may be made whether a latent event threshold is exceeded. In at least one embodiment, decision block 712 may employ embodiments of decision block 512 of FIG. 5 to determine if a latent event threshold is exceeded for the tag in the FLAGGED state. If the latent event threshold is exceeded, then the tag may be moved to the SUSPENSION_A state and processing may flow to block 714; otherwise, processing may loop to block 706, where the tag may remain in the FLAGGED state. In some embodiments, process 700 may employ embodiments of block 524 of FIG. 5 to move a tag to the SUSPENSION_A state.

At block 714, the tag may be employed in the SUSPENSION_A state. In some embodiments, a tag in the SUSPENSION_A state may remain in the SUSPENSION_A state for a predetermined period of time. In at least one embodiment, the tag latency may not be monitored while the tag is in the SUSPENSION A state. In some embodiments, a tag in the SUSPENSION A state may be blocked and may not be enabled to be deployed.

In some embodiments, a user may manually move a tag in the SUSPENSION A state to the NORMAL by "resetting" the tag. In at least one embodiment, block 714 may employ embodiments of block 706 to "reset" a tag. If the tag in the SUSPENSION A state is manually "reset" to the NORMAL state, then process 700 may loop (not shown) to block 702.

Process 700 continues at decision block 716, where a determination may be made whether the time period for the tag to remain in the SUSPENSION A state has elapsed. In at least one embodiment, the time period may be determined and/or modified by a user. In some embodiments, the time period may be 20 minutes. However, embodiments are not so limited and other time periods may be employed. If the time period has elapsed, then the tag may be moved to a SUSPENSION B state and processing may flow to block 718; otherwise, processing may loop to block 714, where the tag may remain in the SUSPENSION_A state.

At block 718, the tag may be employed in the SUSPENSION_B state. In at least one embodiment, a tag in the SUSPENSION B state may be blocked and may not be enabled to be deployed. In at least one embodiment, the tag latency of a tag in the SUSPENSION B state may be monitored every one minute. However, other frequencies for monitoring tags in the SUSPENSION B state may be employed.

In some embodiments, a user may manually move a tag in the SUSPENSION B state to the NORMAL by "resetting" the tag. In at least one embodiment, block 718 may employ embodiments of block 706 to "reset" a tag. If the tag in the SUSPENSION B state is manually "reset" to the NORMAL state, then process 700 may loop (not shown) to block 702.

Process 700 next proceeds to decision block 720, where a determination may be made whether a latent event for the tag has occurred. In at least one embodiment, decision block 720 may employ embodiments of decision block 704 to determine if a latent event has occurred. If a latent event has occurred, then processing may flow to decision block 722; otherwise, processing may flow to decision block 724.

At decision block 722, a determination may be made whether a latent event threshold is exceeded. In at least one embodiment, decision block 722 may employ embodiments of decision block 518 of FIG. 5 to determine if a latent event threshold is exceeded for the tag in the SUSPENSION B state. If the latent event threshold is exceeded, then the tag may be moved to the SUSPENSION_A state and processing may flow to block 714; otherwise, processing may loop to block 718, where the tag may remain in the SUSPENSION B state. In some embodiments, process 700 may employ embodiments of block 524 of FIG. 5 to move a tag to the SUSPENSION A state.

If, at decision block 720, a latent event has not occurred, then processing may flow from decision block 720 to decision block 724. At decision block 724, a determination may be made whether a non-latent event threshold is exceeded. In at least one embodiment, decision block 724 may employ embodiments of decision block 618 of FIG. 6 to determine if a non-latent event threshold is exceeded for the tag in the SUSPENSION B state. If the non-latent event threshold is exceeded, then the tag may be moved to the FLAGGED state and processing may loop to block 706; otherwise, processing may loop to block 718, where the tag may remain in the SUSPENSION B state. In some embodiments, process 700 may employ embodiments of block 506 of FIG. 5 to move a tag to the FLAGGED state.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multiprocessor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Figure 8:
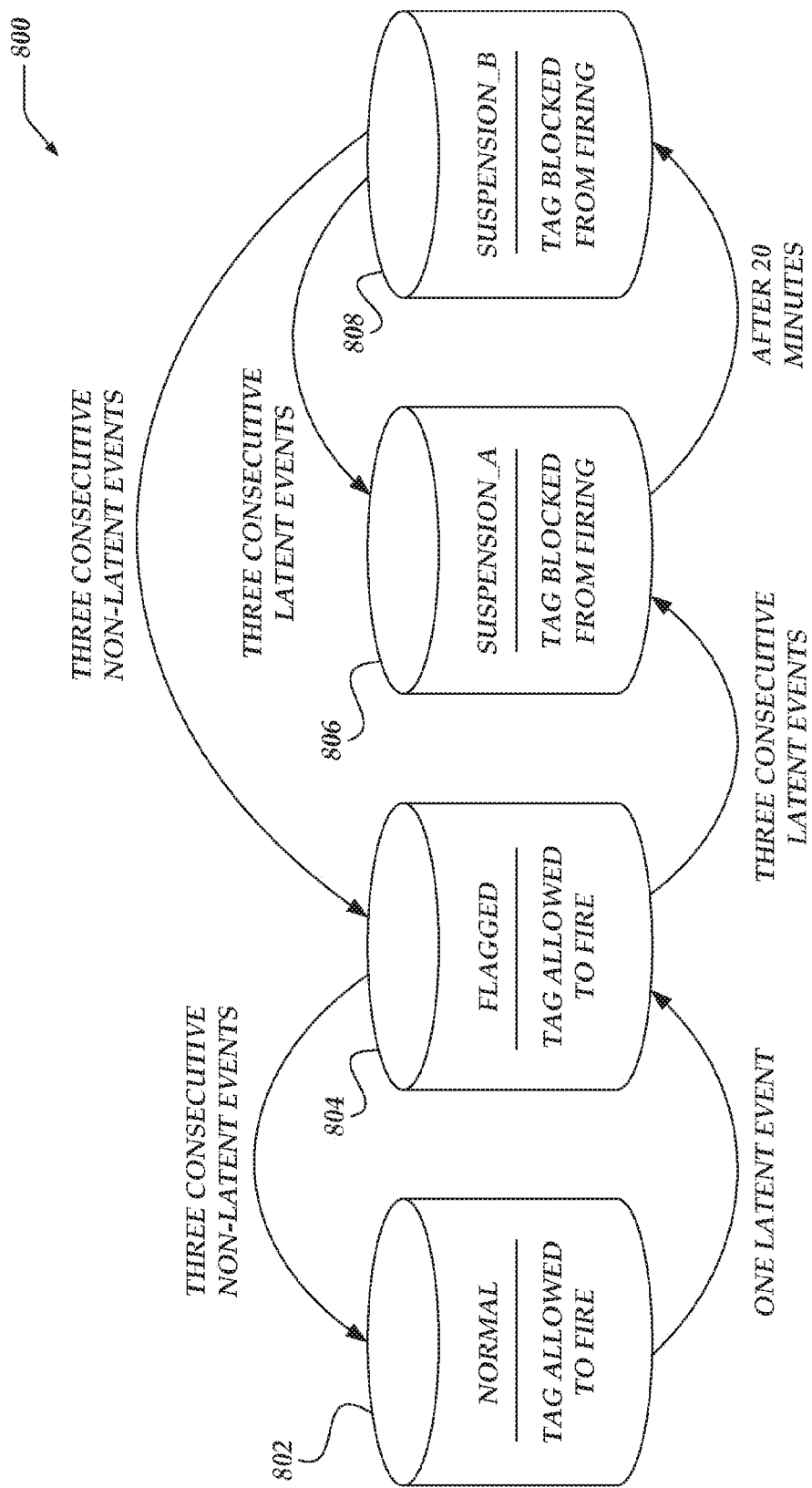
FIG. 8 shows one embodiment of a use case illustrating graphical representation of a plurality of tag states and events that may trigger a state change.

FIG. 8 shows one embodiment of a use case illustrating graphical representation of a plurality of tag states and events that may trigger a state change. As shown, tags may be in one of five states of system 800: NORMAL state 802, FLAGGED state 804, SUSPENSION_A state 806, or SUSPENSION_B state 808. In some embodiments, tag in NORMAL state 802, FLAGGED state 806, SUSPENSION A state 806, and/or SUSPENSION B state 808 may be employed similar to embodiments of block 702, block 706, block 714, and/or block 718 of FIG. 7, respectively.

A tag in NORMAL state 802 may be allowed to be fired. In at least one embodiment, allowing a tag to fire may include determining the tag is available to be deployed and enabling the tag to be deployed. In some embodiments, a tag in NORMAL state 802 may be moved to FLAGGED state 804 if one latent event is monitored for the tag. However, embodiments are not so limited; but rather, other metrics may be employed to determine if a tag is moved from NORMAL state 802, which is described in more detail below.

A tag in FLAGGED state 804 may be allowed to be fired. In some embodiments, a tag in FLAGGED state 804 may be moved to SUSPENSION A state 806 if three consecutive latent events are monitored for the tag. In other embodiments, a tag in FLAGGED state 804 may be moved to NORMAL state 802 if three consecutive non-latent events are monitored for the tag. However, embodiments are not so limited; but rather, other metrics may be employed to determine if a tag is moved from FLAGGED state 804, which is described in more detail below.

A tag in SUSPENSION A state 806 may be blocked from firing. In at least one embodiment, blocking a tag from firing include determining the tag is unavailable to be deployed and not enabling the tag to be deployed. In some embodiments, a tag in SUSPENSION_A state 806 may be moved to SUSPENSION_B state 808 after remaining in the SUSPENSION A state for 20 minutes. However, embodiments are not so limited; but rather, other metrics may be employed to determine if a tag is moved from SUSPENSION A state 806, which is described in more detail below.

A tag in SUSPENSION B state 808 may be blocked from firing. In some embodiments, a tag in SUSPENSION_B state 808 may be moved to SUSPENSION_A state 806 if three consecutive latent events are monitored for the tag. In other embodiments, a tag in SUSPENSION B state 808 may be moved to FLAGGED state 804 if three consecutive non-latent events are monitored for the tag. However, embodiments are not so limited; but rather, other metrics may be employed to determine if a tag is moved from SUSPENSION B state 808.

It should be noted that FIG. 8 shows one embodiment of a plurality of states and the movement of a tag from one state to another state. However, embodiments are not so limited. For example, in some embodiments, a different number of states may be employed. In other embodiments, a tag may move from one state to another state, which may not be illustrated in FIG. 8, such as, for example, a tag may change from NORMAL state 802 to SUSPENSION A state 806. In yet other embodiments, each state may employ different metrics to determine if a tag is moved from a given state and which state the tag is moved to. In some embodiments, these metrics may be predetermined, configurable, and/or modifiable for each user. Different embodiments of metrics that may be employed may include, but are not limited to, a number of consecutive latent events, a number of latent events within a predetermined time period, a severity of a latent event (e.g., a tag latency value above a severity threshold value), a number of consecutive latent events above the severity threshold, a number of latent events above the severity threshold within a predetermined time period, a number of consecutive non-latent events, a number of non-latent events within a predetermined time period, a mildness of one or more non-latent events (e.g., a tag latency value below a mildness threshold value), a number of consecutive non-latent events below the mildness threshold, a number of non-latent events below the mildness threshold within a predetermined time period, a time duration a tag is in a given state, or the like, or any combination thereof.

ALTERNATIVE EMBODIMENT

Figure 9A:
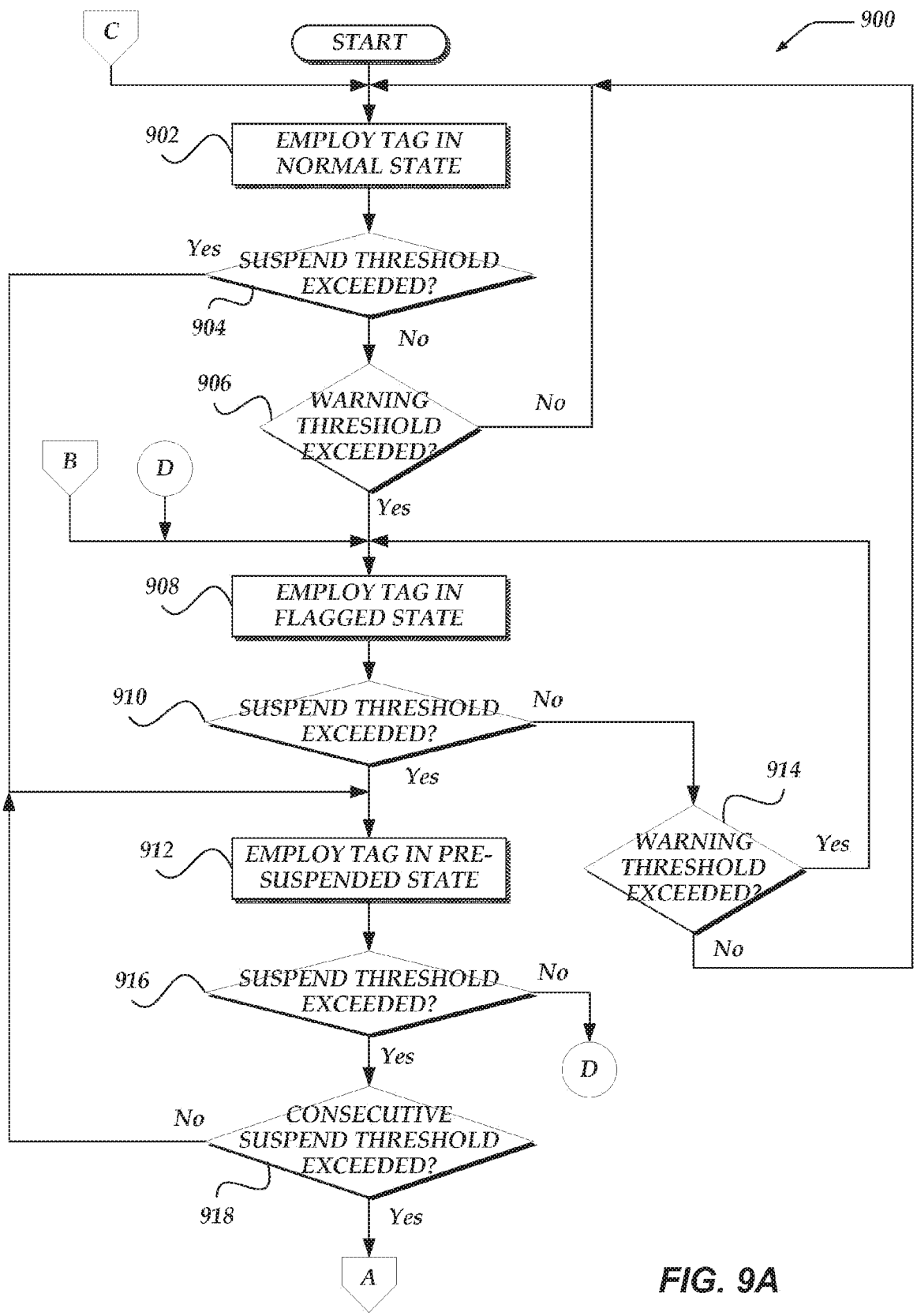
FIGS. 9A-9B illustrate a logical flow diagram generally showing an alternative embodiment of a process for employing a tag in one of a plurality of states and changing the tag state based on tag latency.
Figure 9B:
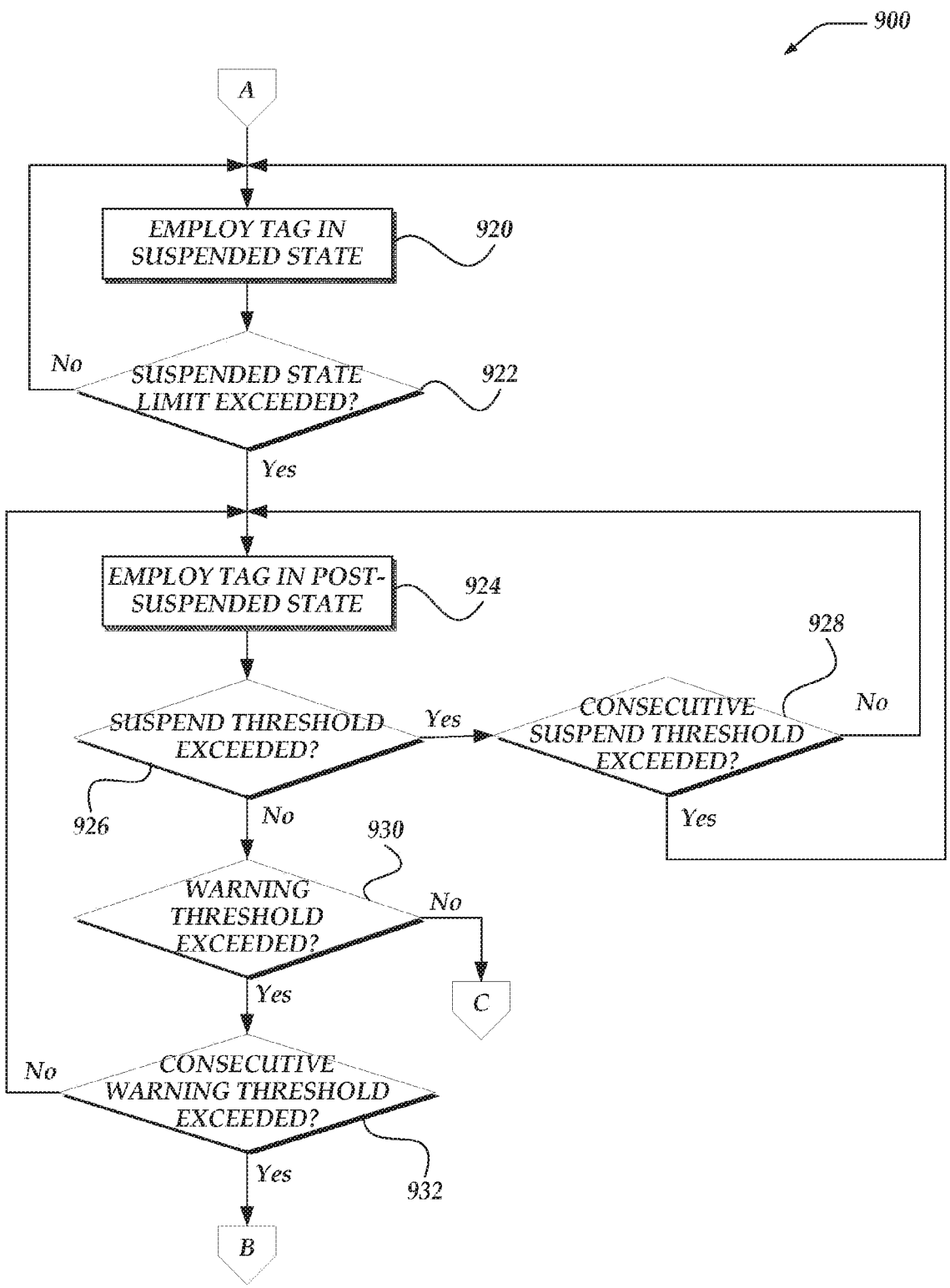

FIGS. 9A-9B illustrate a logical flow diagram generally showing an alternative embodiment of a process for employing a tag in one of a plurality of states and changing the tag state based on tag latency. In some embodiments, process 900 of FIGS. 9A-9B may be implemented by and/or executed on a single network device, such as network device 300 of FIG. 3. In other embodiments, process 900 or portions of process 900 of FIGS. 9A-9B may be implemented by and/or executed on a plurality of network devices, such as network device 300 of FIG. 3.

Process 900 begins, after a start block, at block 902, where a tag may be employed in a NORMAL state. In at least one embodiment, block 902 may employ embodiments of block 702 of FIG. 7 to employ the tag in a NORMAL state. In some embodiments, a tag in the NORMAL state may have a monitoring frequency of 15 minutes.

Process 900 proceeds to decision block 904, where a determination may be made whether a monitored tag latency of a tag exceeded a suspend threshold. In at least one embodiment, the suspend threshold may be a predetermined tag latency (i.e., a predetermined amount of time). In at least one embodiment, the suspend threshold may be determined and/or modified by a user. If the tag latency exceeds the suspend threshold, then the tag may be moved to a PRE-SUSPENSION state and processing may flow to block 912; otherwise, processing may flow to decision block 906.

At decision block 906, a determination may be made whether the tag latency a tag exceeds a warning threshold. In at least one embodiment, the warning threshold may be a predetermined tag latency. In at least one embodiment, the warning threshold may be determined and/or modified by a user. In some embodiments, the warning threshold may be greater than a user desired tag latency, but less than the suspend threshold. If the tag latency exceeds the warning threshold (but does not exceed the suspend threshold), then the tag may be moved to a FLAGGED state and processing may flow to block 908; otherwise, processing may loop to block 902, where the tag may remain in the NORMAL state.

At block 908, the tag may be employed in the FLAGGED state. In at least one embodiment, block 908 may employ embodiments of block 706 of FIG. 7 to employ the tag in a FLAGGED state. In some embodiments, a tag in the FLAGGED state may have a monitor frequency of five minutes. In at least one embodiment, tags in the FLAGGED state may remain in the FLAGGED state until the tag latency exceeds a suspend threshold (such as at decision block 910) or does not exceed a warning threshold (such as at decision block 914). In some embodiments, an email, text message, or other notification may be sent to users indicating that a tag is in the FLAGGED state.

Process 900 continues at decision block 910, where a determination may be made whether the tag latency of a tag exceeds a suspend threshold. In at least one embodiment, decision block 910 may employ embodiments of decision block 904 to determine if the suspend threshold is exceeded. If the tag latency exceeds the suspend threshold, then the tag may be moved to a PRE-SUSPENDED state and processing may flow to block 912; otherwise, processing may flow to decision block 914.

At decision block 914, a determination may be made whether the tag latency of a tag exceeds a warning threshold. In at least one embodiment, decision block 910 may employ embodiments of decision block 904 to determine if the warning threshold is exceeded. If the tag latency exceeds the warning threshold (but does not exceed the suspend threshold), then the tag may remain in the FLAGGED state and processing may loop to block 908; otherwise, the tag may be moved to the NORMAL state and processing may loop to block 902.

If, at decision block 910, the tag latency exceeds the suspend threshold, then processing may flow from decision block 910 to block 912. At block 912, the tag may be employed in a PRE-SUSPENDED state. In at least one embodiment, the tag may not be blocked and may be enabled to be deployed. In some embodiments, a tag in the PRE-SUSPENDED state may have a monitor frequency of one minute. In at least one embodiment, tags in the PRE-SUSPENDED state may remain in the PRE-SUSPENDED state for a time period of five minutes.

Process 900 next proceeds to decision block 916, where a determination may be made whether the tag latency of a tag exceeds a suspend threshold. In at least one embodiment, decision block 916 may employ embodiments of decision block 904 to determine if the suspend threshold is exceeded. If the tag latency exceeds the suspend threshold, then processing may flow to decision block 918; otherwise, the tag may be moved to the FLAGGED state and processing may loop to block 908.

At decision block 918, a determination may be made whether a consecutive number of suspend thresholds is exceeded. In at least one embodiment the consecutive suspend threshold may be two consecutive monitored tag latencies that exceed the suspend threshold. If the consecutive suspend threshold is exceeded, then the tag may be moved to a SUSPENDED state and processing may flow to block 920 of FIG. 9B; otherwise, processing may loop to block 912, where the tag may remain in the PRE-SUSPENDED state.

Process 900 continues at block 920 of FIG. 9B, where the tag may be employed in a SUSPENDED state. In at least one embodiment, the tag may be blocked and may not be enabled to be deployed. In some embodiments, a tag in the SUSPENDED state may not be monitored. In at least one embodiment, tags in the SUSPENDED state may remain in the SUSPENDED state for a time period of 30 minutes. In some embodiments, an email, text message, or other notification may be sent to users indicating that a tag is in the FLAGGED state.

Process 900 next proceeds to decision block 922, where a determination may be made whether a suspended state limit is exceeded. In at least one embodiment, the suspended state limit may be 30 minutes. If the suspended state limit is exceeded, then the tag may be moved to a POST-SUSPENDED state and processing may flow to block 924; otherwise, processing may loop to block 920, where the tag may remain in the SUSPENDED state.

At block 924, the tag may be employed in a POST-SUSPENDED state. In at least one embodiment, the tag may be blocked and may not be enabled to be deployed. In some embodiments, a tag in the POST-SUSPENDED state may have a monitor frequency of five minutes. In at least one embodiment, tags in the POST-SUSPENDED state may remain in the POST-SUSPENDED state for a time period of five minutes.

Process 900 continues at decision block 926, where a determination may be made whether the tag latency of a tag exceeds a suspend threshold. In at least one embodiment, decision block 926 may employ embodiments of decision block 904 to determine if the suspend threshold is exceeded. If the tag latency exceeds the suspend threshold, then processing may flow to decision block 928; otherwise, processing may flow to decision block 930.

At decision block 928, a determination may be made whether a consecutive number of suspend thresholds is exceeded. In at least one embodiment, decision block 928 may employ embodiments of decision block 918 of FIG. 9A to determine if the consecutive suspend threshold is exceeded. In at least one embodiment the consecutive suspend threshold may be two consecutive monitored tag latencies that exceed the suspend threshold. If the consecutive suspend threshold is exceeded, then the tag may be moved to a SUSPENDED state and processing may loop to block 920; otherwise, processing may loop to block 924, where the tag may remain in the POST-SUSPENDED state.

If, at decision block 926, the tag latency does not exceed the suspend threshold, then processing may flow from decision block 926 to decision block 930. At decision block 930, a determination may be made whether the tag latency of a tag exceeds a warning threshold. In at least one embodiment, decision block 930 may employ embodiments of decision block 904 to determine if the warning threshold is exceeded. If the tag latency exceeds the warning threshold (but does not exceed the suspend threshold), then processing may flow to decision block 932; otherwise, the tag may be moved to the normal state and processing may loop to block 902 of FIG. 9A.

At decision block 932, a determination may be made whether a consecutive number of warning thresholds is exceeded. In at least one embodiment the consecutive warning threshold may be two consecutive monitored tag latencies that exceed the warning threshold. If the consecutive warning threshold is exceeded, then the tag may be moved to the FLAGGED state and processing may loop to block 922 of FIG. 9A; otherwise, processing may loop to block 924, where the tag may remain in the POST-SUSPENDED state.

Figure 10:
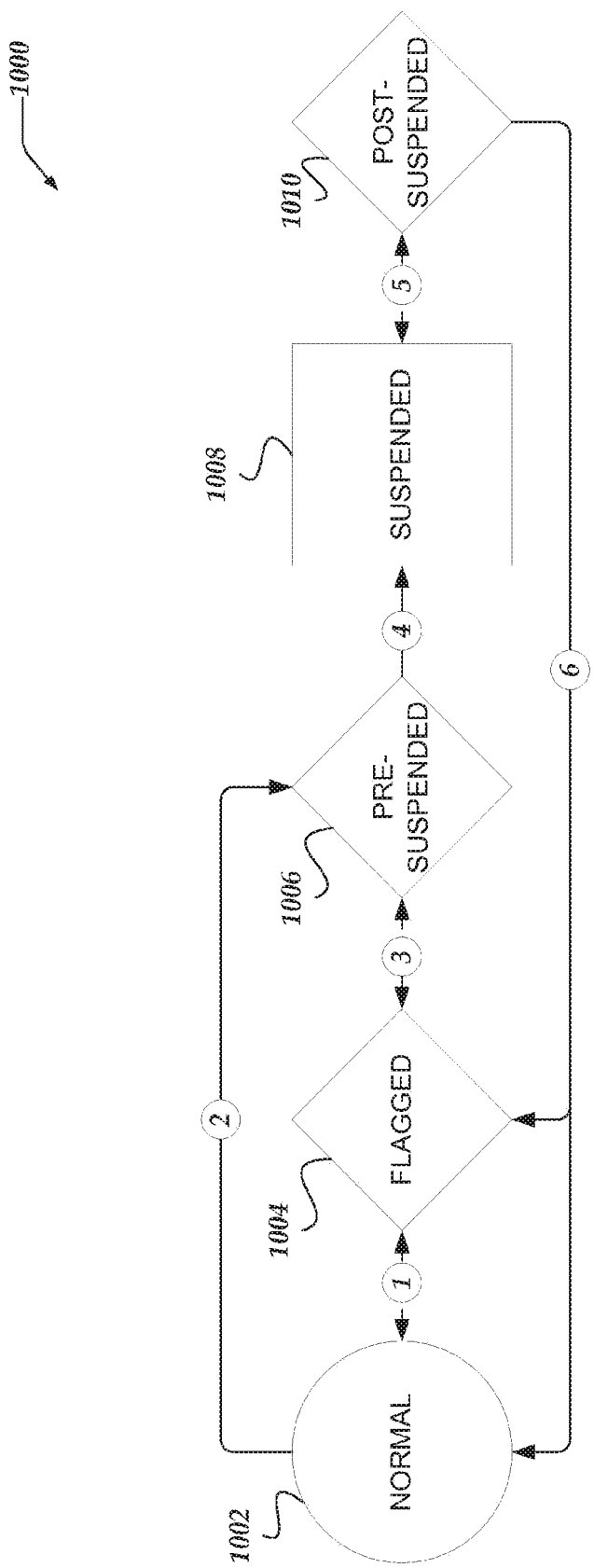
FIG. 10 shows an alternative embodiment of a use case illustrating graphical representation of a plurality of tag states and events that may trigger a state change.

FIG. 10 shows an alternative embodiment of a use case illustrating graphical representation of a plurality of tag states and events that may trigger a state change. As shown, tags may be in one of five states of system 1000: NORMAL state 1002, FLAGGED state 1004, PRE-SUSPENDED state 1006, SUSPENDED state 1008, or POST-SUSPENDED state 1010. In some embodiments, tag in NORMAL state 1002, FLAGGED state 1004, PRE-SUSPENDED state 1006, SUSPENDED state 1008, and/or POST-SUSPENDED state 1010 may be employed similar to embodiments of block 902, block 908, block 912, block 920, and/or block 924 of FIG. 9, respectively.

Step 1: tags in NORMAL state 1002 that exceed a specified warning threshold may be moved to FLAGGED state 1004. Tags in FLAGGED state 1004 may return to NORMAL state 1002 if latency numbers subside (i.e. a monitored tag latency is less than the warning threshold).

Step 2: tags in NORMAL state 1002 that exceed a specified suspend threshold may be moved to PRE-SUSPENDED state 1006. In at least one embodiment, the suspend threshold may be greater than the warning threshold. In one non-limiting, non-exhaustive example, the warning threshold may be 500 milliseconds and the suspend threshold may be 800 milliseconds.

Step 3: tags in FLAGGED state 1004 that exceed the suspend threshold may be moved to PRE-SUSPENDED state 1006. Tags in PRE-SUSPENDED state 1006 may return to FLAGGED state 1004 if latency numbers subside (i.e. a monitored tag latency is less than the suspend threshold).

Step 4: tags in PRE-SUSPENDED state 1006 that exceed the suspend threshold for two consecutive attempts may be moved to SUSPENDED state 1008.

Step 5: tags in SUSPENDED state 1008 that have reached their suspended state limit (e.g., 30 minutes may be moved to POST-SUSPENDED state 1010. Tags in POST-SUSPENDED state 1010 may return to SUSPENDED state 1008 if they exceed the suspend threshold for two consecutive attempts. In some embodiments, the suspend threshold employed to determine when to move tags from one state to another state may be the same or different threshold values.

Step 6: tags in POST-SUSPENDED state 1010 can move to FLAGGED state 1004 if they exceed the warning threshold for two consecutive attempts. Tags in the POST-SUSPENDED state 1010 can move to NORMAL state 1002 if they do not exceed the warning threshold or the suspend threshold for two consecutive attempts.

Use Case Operating Environment

Figure 11:
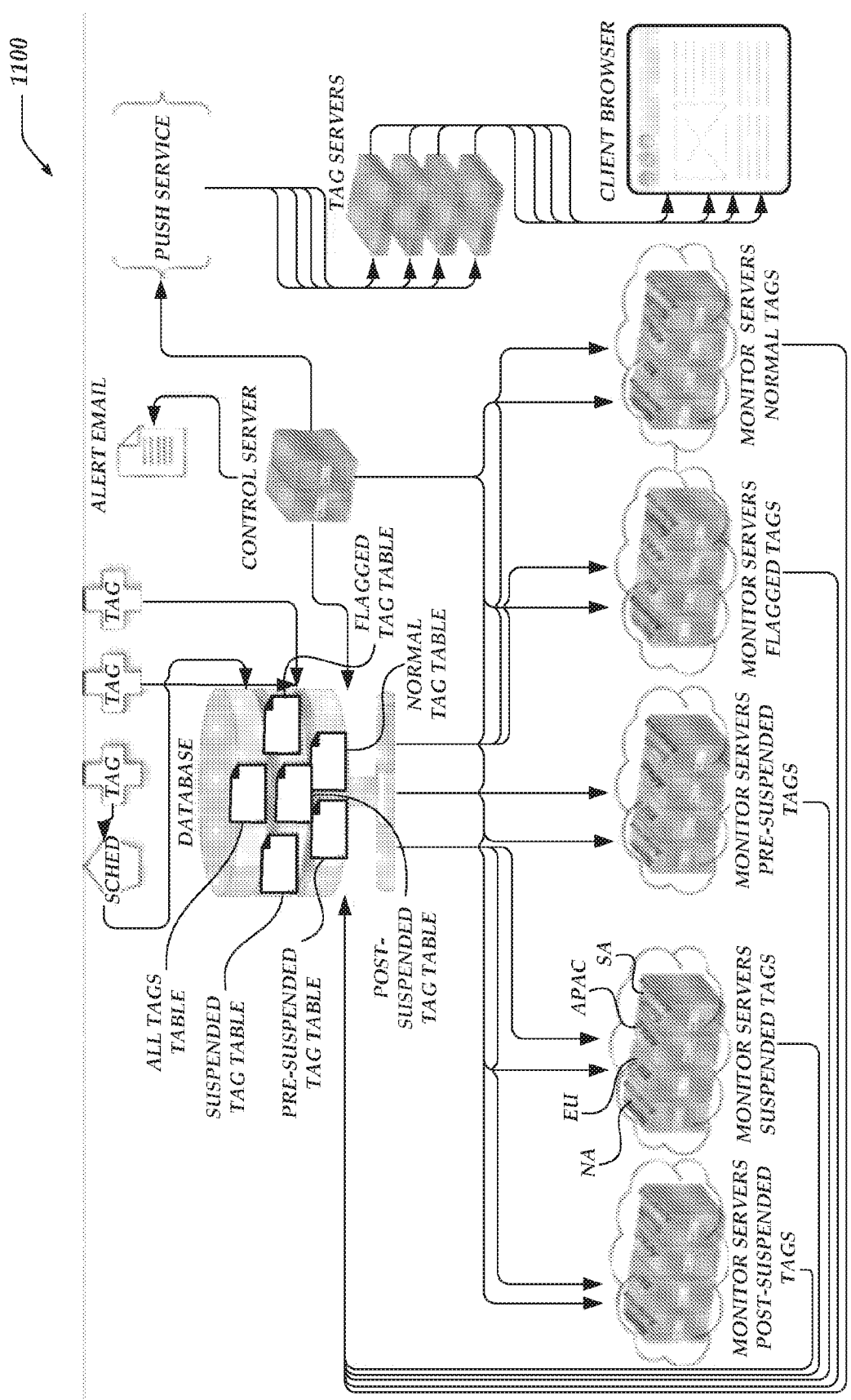
FIG. 11 shows one embodiment of a use case illustrating a system diagram of a system that may be utilized to monitor tag latency and control tag state changes and deployment.

FIG. 11 shows one embodiment of a use case illustrating a system diagram of a system that may be utilized to monitor tag latency and control tag state changes and deployment. As shown, system 1100 may include a plurality of monitor servers, a control server, a database, and tag servers. In some embodiments, the plurality of monitor servers may be similar to embodiments of TMSD 112 of FIG. 1. The plurality of monitor servers may include multiple groups of monitor servers to monitor tags in different states, including: monitor servers post-suspended tags, monitor servers suspended tags, monitor servers pre-suspended tags, monitor servers flagged tags, and monitor servers normal tags. Each of the groups of monitor servers may be physically located at different geographic locations, such as North America (NA), Europe (EU), Asia (i.e., Asia and Pacific (APAC)), and South America (SA). In some embodiments, a user may be enabled to select which geographic location of monitor servers may monitor tags. The selected geographic locations of the monitor servers may be included in the latency profile associated with the tag. For example, for a particular tag, the user may select the United States, Europe, and South America. In this example, the tag latency for that particular tag would be monitored individually for each of the United States, Europe, and South America. Further, a maximum time latency threshold may be determined for each of the United States, Europe, and South America. The maximum time latency threshold may be the same for each geographic location, however, the present disclosure is not limited thereto. If a request to access a website is received from a client browser, the control server may evaluate the IP address associated with the request to determine a geographic location of the client browser. For example, if the client browser is associated with an IP address located within South America, the control server may access the latency profile to determine the state of the tag within South America. As a non-limiting example, the tag latency for South America may exceed the maximum time latency threshold, and thus, the control server may determine not to deploy the tag to the client browser.

A database may contain a list of all tags (i.e. all tags table). The database may also include a plurality of tables for each of a plurality of tag states, including: suspended tag table, pre-suspended tag table, post-suspended tag table, normal tag table, and flagged tag table.

A control server may access the database to determine which tags to monitor and when. In some embodiments, the control server may be similar to embodiments of TCSD 114 of FIG. 1. When a tag is to be monitored, the control server may notify (e.g., send a tag identifier) the monitor servers in the selected geographic location for the current state of the tag. For example, if a user selects Europe monitor servers and a tag in the FLAGGED state is to be monitored, then the control server may notify the monitor servers flagged tags in Europe. Each of the plurality of monitor servers may provide a tag latency of monitored tags to the control server. Based on the tag latency, the control server may determine whether or not to change a tag's state. If the tag state changes, the control server may modify the appropriate tables in the database to reflect the changed state. In some embodiments, the control server may send an email or other notification to a user if a tag changes to a specific state (e.g., flagged, suspended, or the like). Additionally, the control server may communicate with a push service to identify tags that are available for deployment (i.e., enable a tag for deployment).

The push service may be configured to provide tags to the tag servers. In at least one embodiment, the push service may provide the tag servers with the most up-to-date information on available tags received from the control server. Based on the information provided by the push service, the tag servers may deploy tags in a web page of the client browser. In some embodiments, the tag servers may be similar to embodiments of TDSD 116 of FIG. 1. In at least one embodiment, the control server and the monitoring servers may execute asynchronously to web page requests (including the push service and the tag servers).

In some embodiments, if a tag is blocked from deployment (e.g., in SUSPENSION A state 806 and/or SUSPENSION B state 808 of FIG. 8 or SUSPENDED state 1008 and/or POST-SUSPENDED state 1010 of FIG. 10), the control server may enable an "inert" tag for deployment instead of the blocked tag. In at least one embodiment, an inert tag may be a non-executable version of the blocked tag. In some embodiments, the inert tag may be utilized to determine a number of times the blocked tag might have been deployed, but was not (because it was blocked). In at least one embodiment, the control server may provide the inert tag to the push service and ultimately to the tag servers. In some embodiments, the tag servers may treat the inert tag as a real tag for gathering statistical information about tags, but may not deploy the inert tag.

It will be appreciated that the tag may be code that is embedded into an application (e.g., a mobile application or an application running on a set-top box device that streams IPTV). According to certain embodiments of the present disclosure, the tags within an application can be managed to control which tags to deploy and which tags to suspend from deployment. In some examples, the third-party embedded code running in an application may cause the application to run slowly, incorrectly, inefficiently, or not at all. As a non-limiting example, the embedded code may be JavaScript code within a video streaming application, and the JavaScript code may collect data about which shows are viewed within the video streaming application. The embedded code may be embedded into the application by a third-party service that seeks to evaluate the collected data in order to optimize the presentation of data within the application.

In certain embodiments, the monitor server may evaluate the embedded code (e.g., tags) within the application to determine whether or not to deploy the embedded code when the application is running on a set-top box device. It will be appreciated that the present disclosure is not limited to evaluating the tag latency when determining whether or not to deploy the tag. In some embodiments, tags may be evaluated for privacy concerns. Results of the evaluation may be used to determine whether or not to deploy the tag. For example, if a tag embedded in a mobile application is accessing data generated by or stored within other applications running on the mobile device (e.g., location data of the mobile device generated by location services running on the mobile device), the tag may be modified to be in the FLAGGED state or SUSPENDED state. In this example, the application may evaluate tags to prevent deploying tags that access location services on mobile devices.

The above specification, examples, and data provide a complete description of the composition, manufacture, and use of the invention. Since many embodiments of the invention can be made without departing from the spirit and scope of the invention, the invention resides in the claims hereinafter appended.

What is claimed is:

1. A computer-implemented method, comprising:
monitoring one or more characteristics of code, wherein the code is embeddable in an application, wherein the monitoring is asynchronous to requests to execute the application, and wherein the one or more characteristics of the code characterize a performance of the code while embedded in the application during execution;
determining a state for the code using the one or more characteristics; and
determining a deployability of the code using the state of the code in response to a request to execute the application.

2. The computer-implemented method of claim 1, wherein the code corresponds to a plurality of states that includes at least a normal state, a flagged state, and at least one suspension state.

3. The computer-implemented method of claim 2, wherein the plurality of states includes a state representing a geographic region in which the code is deployed.

4. The computer-implemented method of claim 1, wherein monitoring the one or more characteristics of the code further comprises:
   identifying that the one or more characteristics of the code to be monitored includes a privacy characteristic;
   executing the code embedded within the application while the application is executing;
   determining whether executing the code causes a location service to be accessed; and
   in response to a determination that the location service is accessed, determining that the code is in a flagged state or a suspended state.

5. The computer-implemented method of claim 1, wherein monitoring the one or more characteristics of the code further comprises:
   monitoring the one or more characteristics of the code deployed in a first geographic region;
   determining, based on monitoring the one or more characteristics of the code deployed in the first geographic region, a first state for the code deployed in the first geographic region;
   monitoring the one or more characteristics of the code deployed in a second geographic region, wherein the first geographic region is different from the second geographic region; and
   determining, based on monitoring the one or more characteristics of the code deployed in the second geographic region, a second state for the code deployed in the second geographic region.

6. The computer-implemented method of claim 1, wherein determining a state for the code using the one or more characteristics further comprises:
   executing the code embedded within the application while the application is executing;
   determining whether or not executing the code embedded within the application causes one or more defined actions to be performed; and
   determining the state of the code based on whether or not the one or more defined actions are performed.

7. The computer-implemented method of claim 1, wherein the one or more characteristics of the code include a latency characteristic, and wherein monitoring the latency characteristic includes determining a latency of executing the code embedded within the application.

8. A system, comprising:
   one or more data processors; and
   a non-transitory computer-readable storage medium containing instructions which, when executed on the one or more data processors, cause the one or more data processors to perform operations including:
      monitoring one or more characteristics of code, wherein the code is embeddable in an application, wherein the monitoring is asynchronous to requests to execute the application, and wherein the one or more characteristics of the code characterize a performance of the code while embedded in the application during execution;
      determining a state for the code using the one or more characteristics; and
      determining a deployability of the code using the state of the code in response to a request to execute the application.

9. The system of claim 8, wherein the code corresponds to a plurality of states that includes at least a normal state, a flagged state, and at least one suspension state.

10. The system of claim 9, wherein the plurality of states includes a state representing a geographic region in which the code is deployed.

11. The system of claim 8, wherein monitoring the one or more characteristics of the code further comprises:
    identifying that the one or more characteristics of the code to be monitored includes a privacy characteristic;
    executing the code embedded within the application while the application is executing;
    determining whether executing the code causes a location service to be accessed; and
    in response to a determination that the location service is accessed, determining that the code is in a flagged state or a suspended state.

12. The system of claim 8, wherein monitoring the one or more characteristics of the code further comprises:
    monitoring the one or more characteristics of the code deployed in a first geographic region;
    determining, based on monitoring the one or more characteristics of the code deployed in the first geographic region, a first state for the code deployed in the first geographic region;
    monitoring the one or more characteristics of the code deployed in a second geographic region, wherein the first geographic region is different from the second geographic region; and
    determining, based on monitoring the one or more characteristics of the code deployed in the second geographic region, a second state for the code deployed in the second geographic region.

13. The system of claim 8, wherein determining a state for the code using the one or more characteristics further comprises:
    executing the code embedded within the application while the application is executing;
    determining whether or not executing the code embedded within the application causes one or more defined actions to be performed; and
    determining the state of the code based on whether or not the one or more defined actions are performed.

14. The system of claim 8, wherein the one or more characteristics of the code include a latency characteristic, and wherein monitoring the latency characteristic includes determining a latency of executing the code embedded within the application.

15. A computer-program product tangibly embodied in a non-transitory machine-readable storage medium, including instructions configured to cause a data processing apparatus to perform operations including:
    monitoring one or more characteristics of code, wherein the code is embeddable in an application, wherein the monitoring is asynchronous to requests to execute the application, and wherein the one or more characteristics of the code characterize a performance of the code while embedded in the application during execution;
    determining a state for the code using the one or more characteristics; and
    determining a deployability of the code using the state of the code in response to a request to execute the application.

16. The computer-program product of claim 15, wherein the code corresponds to a plurality of states that includes at least a normal state, a flagged state, and at least one suspension state.

17. The computer-program product of claim 16, wherein the plurality of states includes a state representing a geographic region in which the code is deployed.

18. The computer-program product of claim 15, wherein monitoring the one or more characteristics of the code further comprises:
- identifying that the one or more characteristics of the code to be monitored includes a privacy characteristic;
- executing the code embedded within the application while the application is executing;
- determining whether executing the code causes a location service to be accessed; and
- in response to a determination that the location service is accessed, determining that the code is in a flagged state or a suspended state.

19. The computer-program product of claim 15, wherein monitoring the one or more characteristics of the code further comprises:
- monitoring the one or more characteristics of the code deployed in a first geographic region;
- determining, based on monitoring the one or more characteristics of the code deployed in the first geographic region, a first state for the code deployed in the first geographic region;
- monitoring the one or more characteristics of the code deployed in a second geographic region, wherein the first geographic region is different from the second geographic region; and
- determining, based on monitoring the one or more characteristics of the code deployed in the second geographic region, a second state for the code deployed in the second geographic region.

20. The computer-program product of claim 15, wherein determining a state for the code using the one or more characteristics further comprises:
- executing the code embedded within the application while the application is executing;
- determining whether or not executing the code embedded within the application causes one or more defined actions to be performed; and
- determining the state of the code based on whether or not the one or more defined actions are performed.

* * * * *